Figure 1B:
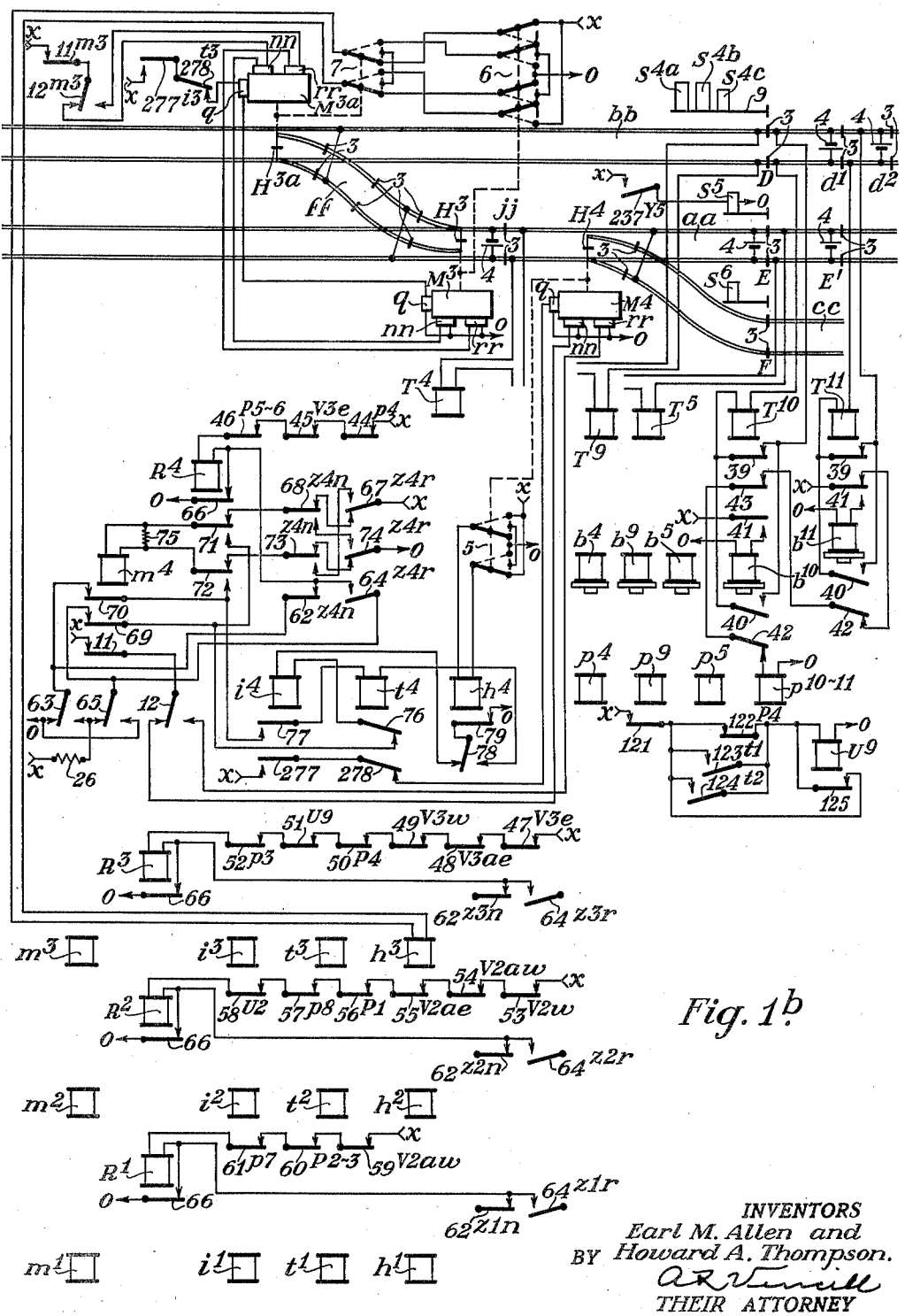

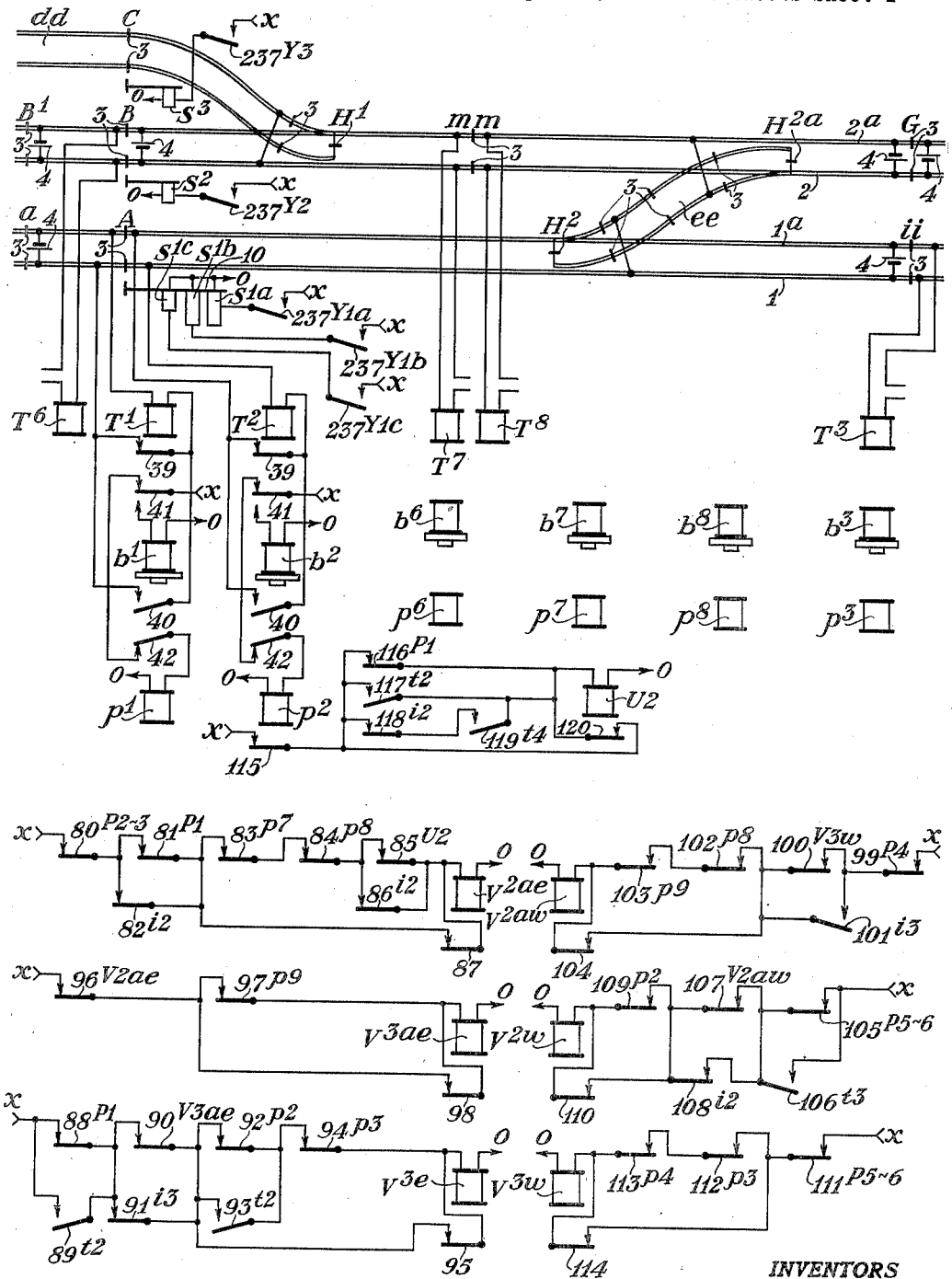
Fig. 1ª
INVENTORS
Earl M. Allen and
Howard A. Thompson.
THEIR ATTORNEY

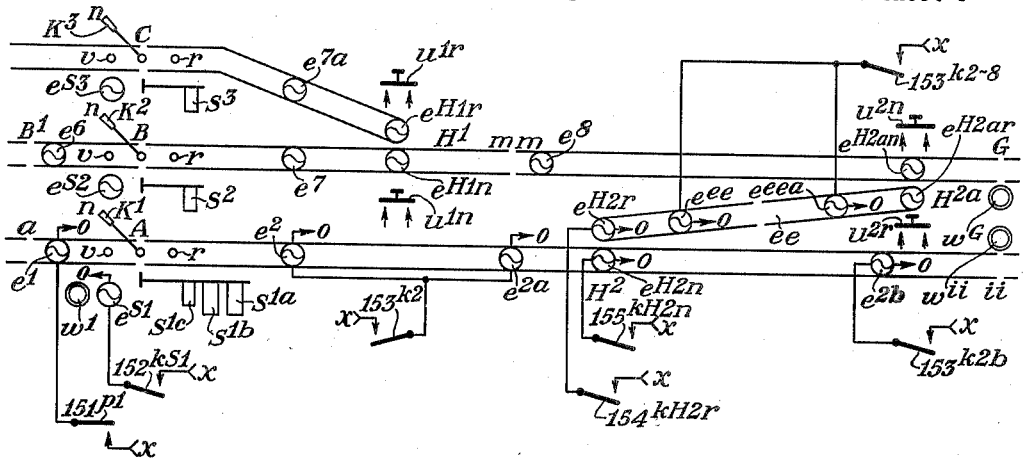
Fig. 2ª
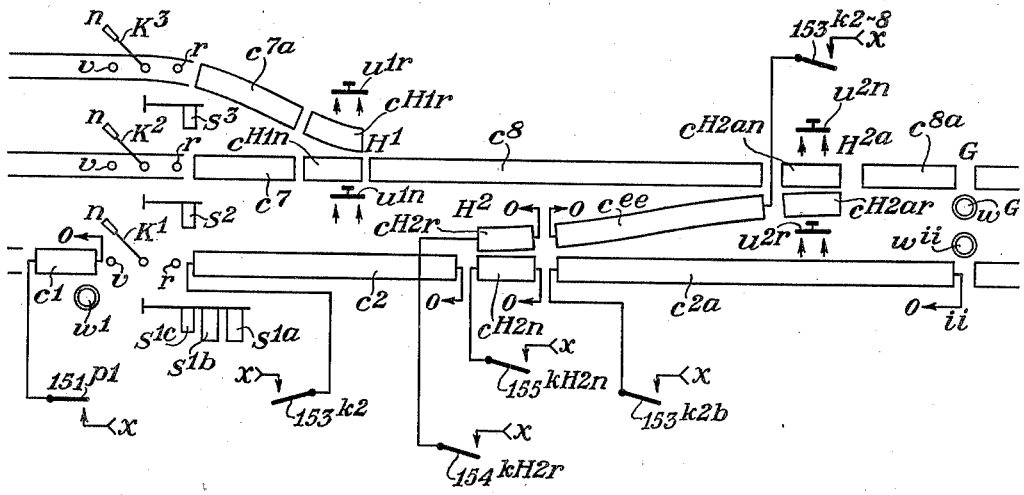
Fig. 3.

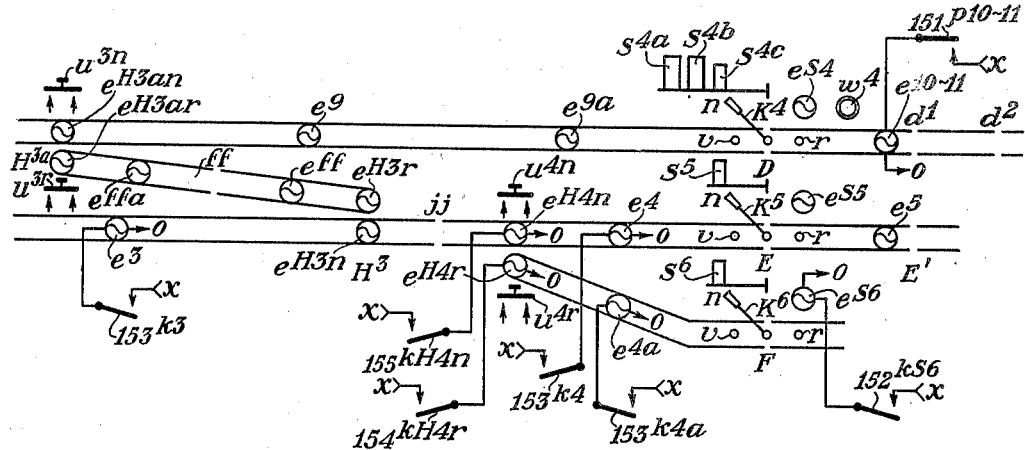
*Fig. 2.*ᵇ
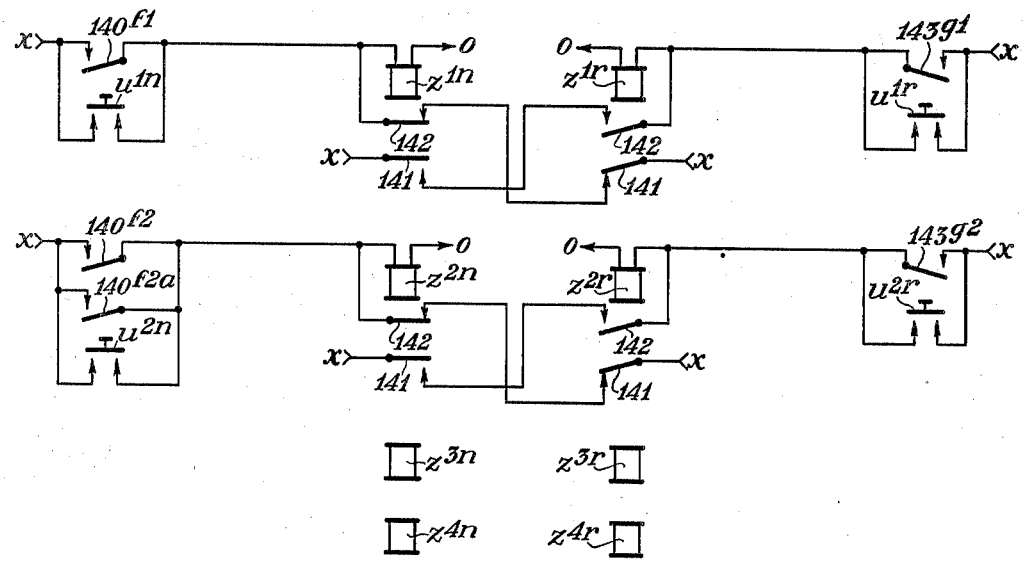
*Fig. 4.*

April 8, 1941.  E. M. ALLEN ET AL  2,237,804
INTERLOCKING CONTROL APPARATUS
Original Filed April 5, 1935  8 Sheets—Sheet 5

INVENTORS
Earl M. Allen and
BY Howard A. Thompson.
THEIR ATTORNEY

INVENTORS
Earl M. Allen and
BY Howard A. Thompson.
THEIR ATTORNEY

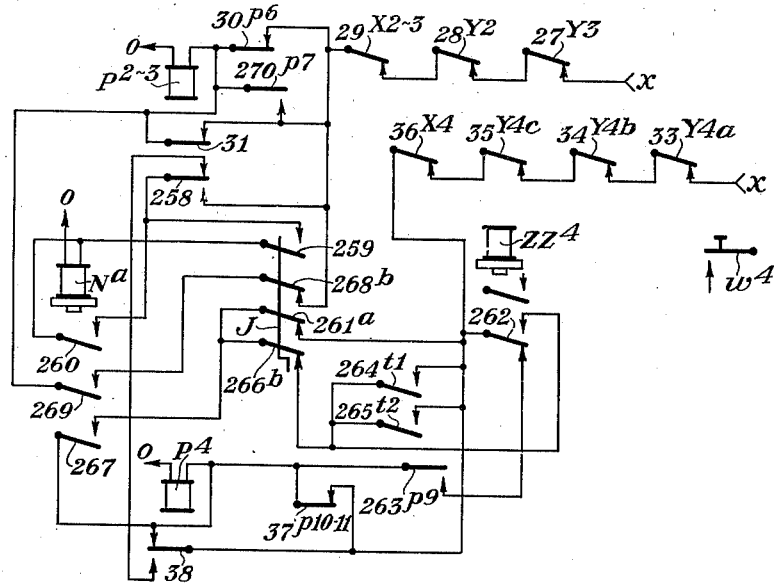
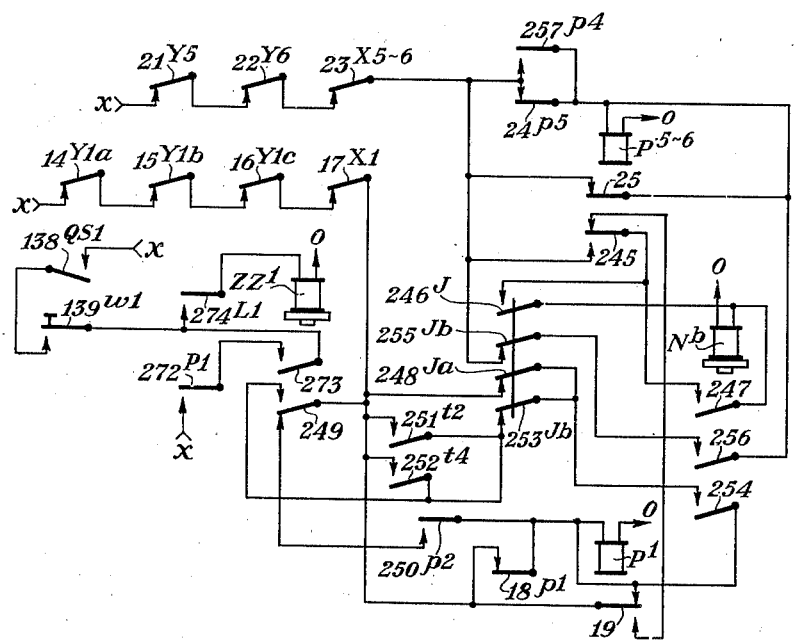
Fig. 7.
INVENTORS
Earl M. Allen and
BY Howard A. Thompson.
THEIR ATTORNEY April 8, 1941.   E. M. ALLEN ET AL   2,237,804
INTERLOCKING CONTROL APPARATUS
Original Filed April 5, 1935   8 Sheets-Sheet 3

INVENTORS
Earl M. Allen and
BY Howard A. Thompson.
THEIR ATTORNEY

Patented Apr. 8, 1941

2,237,804

UNITED STATES PATENT OFFICE 2,237,804

INTERLOCKING CONTROL APPARATUS

Earl M. Allen, Swissvale, and Howard A. Thompson, Wilkinsburg, Pa., assignors to The Union Switch & Signal Company, Swissvale, Pa., a corporation of Pennsylvania Application April 5, 1935, Serial No. 14,868
Renewed August 22, 1936

45 Claims. (Cl. 246—134)

Our invention relates to interlocking control apparatus, and is particularly adapted for, though not limited to, the control of railway track switches and signals in a railway switching or interlocking layout.

One feature of our invention is the provision of novel and improved interlocking control apparatus without the use of interlocked levers, which is an improvement upon the system shown in our Patent No. 2,184,787, granted December 26, 1939. Another feature of our invention is the provision of novel and improved indication apparatus associated with such interlocking control apparatus.

More particularly, the principal object of our invention is the provision of a system of route interlocking of the entrance-exit type in which the switches and signals are controlled by route buttons or miniature levers associated with the entrance and exit ends of the different routes, which is an improvement upon that shown in the United States application Serial No. 726,957, filed May 22, 1934 by L. E. Spray, for Interlocking control apparatus.

In the system of this prior application, a control board is provided which contains a miniature diagram of the track layout to be controlled, with the route buttons mounted thereon at points corresponding with the ends of the routes. Electroresponsive route selecting means is provided which responds to the joint operation of the buttons for the entrance and exit ends of an available route, to automatically operate the track switches to the positions required to set up such route and to then clear the signal at its entrance.

The system of our invention functions in a similar manner, and one object of our invention is to facilitate these operations by the provision of an improved track diagram in which the tracks are illuminated to indicate the condition of a proposed or established route. In one form of our invention miniature lamps mounted in the tracks of the diagram are so controlled that a row of lamps selected by the operation of the buttons for the two ends of a route is lighted to distinctively mark the route on the track diagram, so as to indicate the condition of occupancy of each track section and the position of each track switch of the route, as well as the location of the entrance signal for the route. In another form of our invention substantially linear light sources or illuminated linear strips of translucent material located in the portions of the track represented on the diagram are provided for a similar purpose. In this form a portion of track in the diagram for each unoccupied track section of a route becomes illuminated in response to the operation of the corresponding route buttons to indicate a proposed route, short linear portions each of which represents a track switch of the route become illuminated as the switches assume the required positions and the portion representing the entrance signal becomes illuminated when the route is fully established, so that a completed route is indicated by a substantially continuous illuminated line.

A feature of our invention is the inclusion in the circuits by which the buttons control the electroresponsive route selecting means for setting up the routes, of indication relays and control contacts therefor, for controlling the lamps of the track diagram, and of route relays for controlling the signals in addition to those provided for controlling the track switches, in order to simplify the circuits required.

Another feature of our invention resides in the control of the route selecting means by buttons of the rotary type with the circuits so arranged that a route may also be set up and its representation illuminated on the track diagram without clearing the signal at either end. Other features comprise the provision of auxiliary push buttons for operating each track switch or crossover individually, and other push buttons for designating which of two routes is to be set up by the operation of the route levers when the track layout provides two alternative routes between the same route ends.

Our invention also includes an improved arrangement for locking the track switches wherein the route relays for establishing a route govern switch locking relays provided to prevent operation of the track switches except when conditions are proper. In accordance with our invention the locking relays for the switches of a route release as soon as the route is set up to thereby lock the switches in the required position, this operation being checked by making the clearing of the entrance signal dependent upon the release of these locking relays.

We will describe two forms of apparatus embodying our invention, and will then point out the novel features thereof in claims.

Figure 5A:
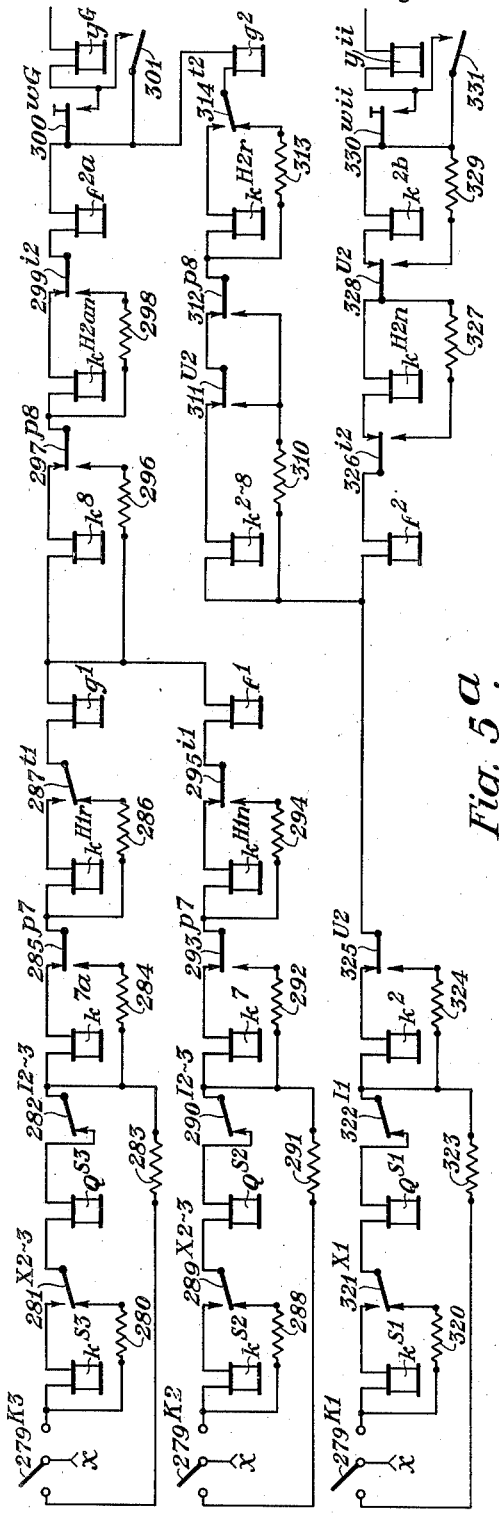
Figure 6A:
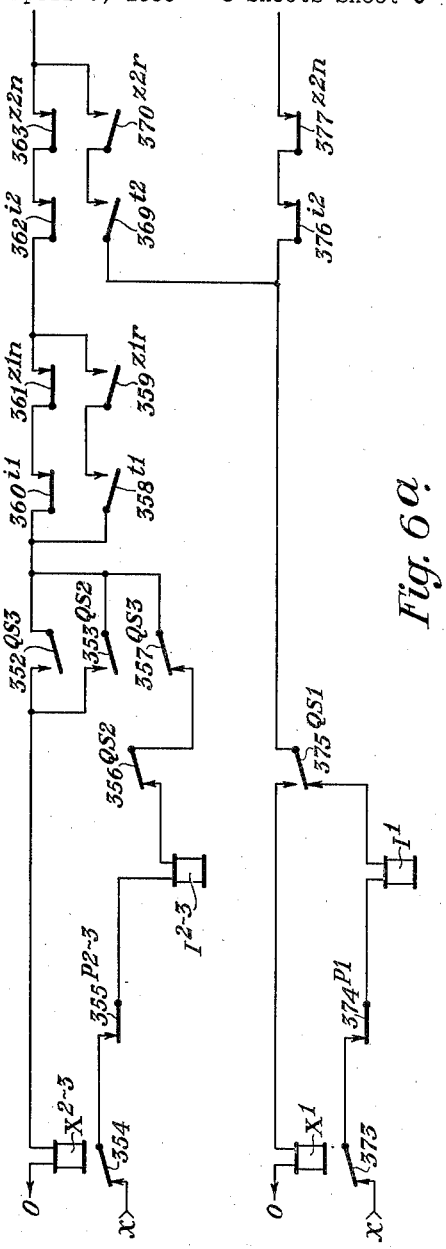
Figure 5B:
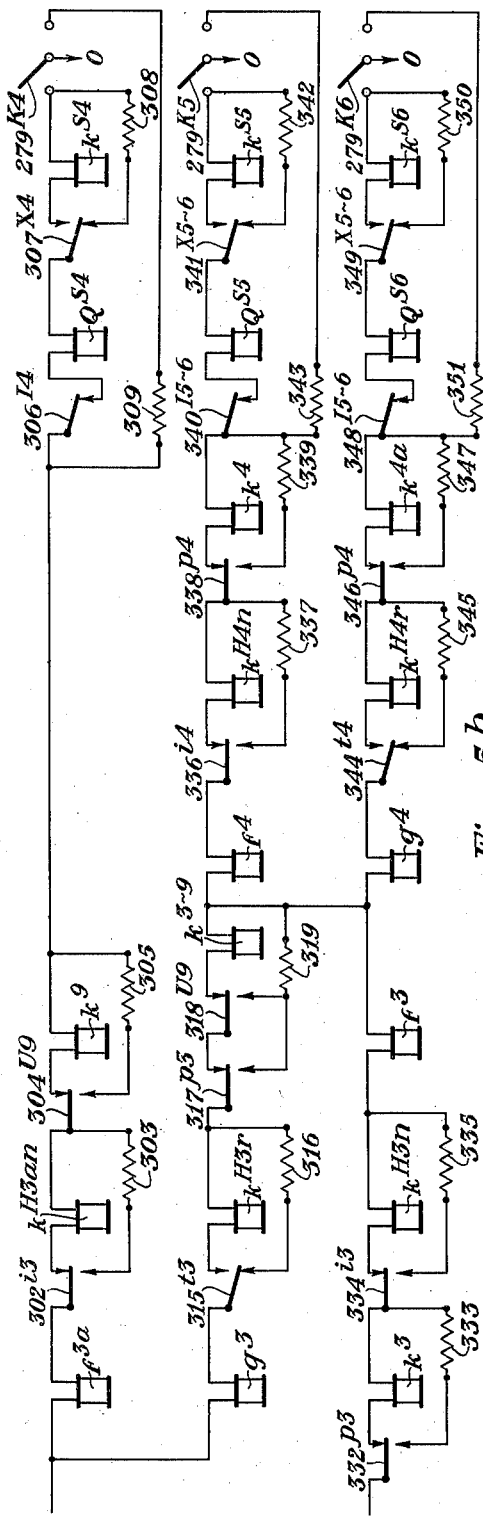
Figure 6B:
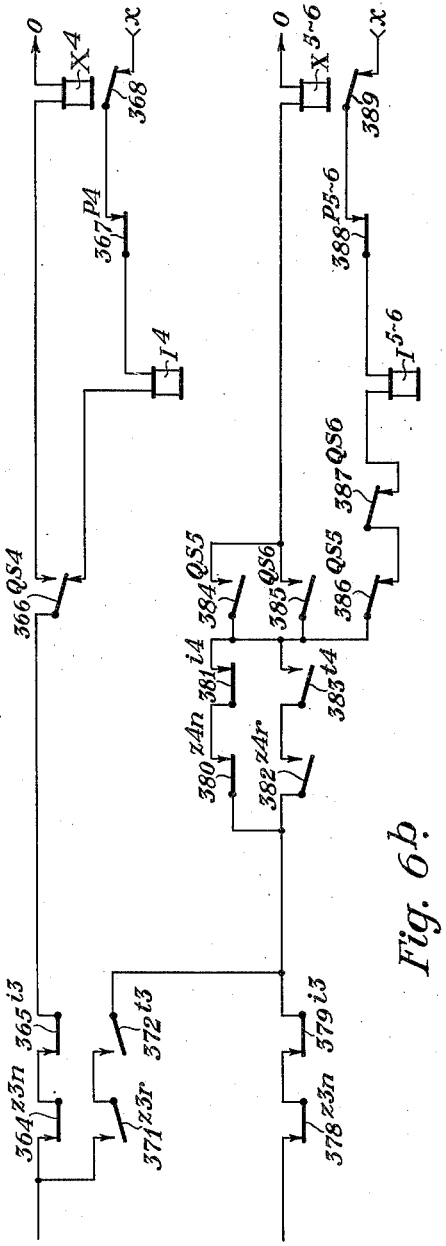
Figure 8:
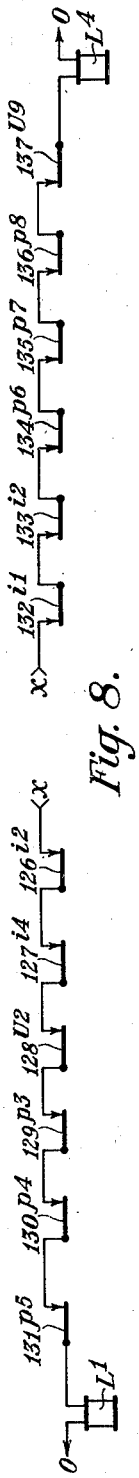
Figure 9:
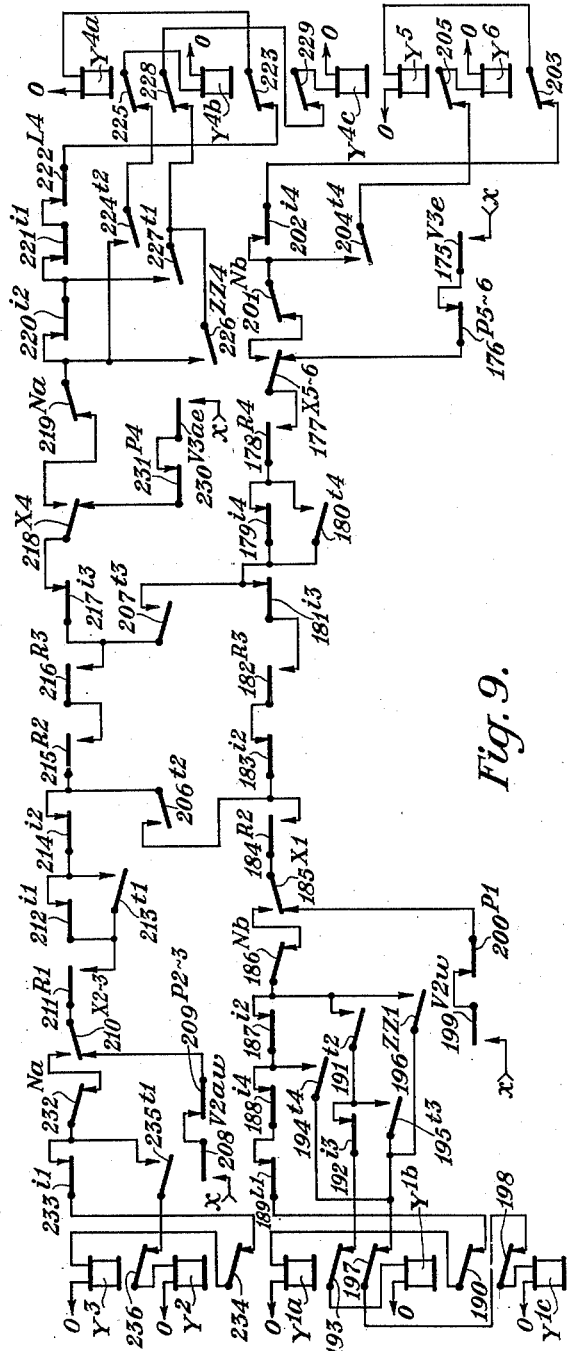

In the accompanying drawings, Figs. 1ª, 1ᵇ, 2ª, 2ᵇ, and 4 to 9, inclusive, are diagrammatic views showing the component parts of one form of apparatus embodying our invention. More specifically, Figs. 1ª and 1ᵇ, when placed side by side, with Fig. 1ª on the left, show a typical track, switch, and signal layout, as well as switch control and indication circuits for apparatus embodying our invention; Figs. 2ᵃ and 2ᵇ, when placed side by side, with Fig. 2ᵃ on the left, show a track model and interlocking control board for the layout shown in Figs. 1ᵃ and 1ᵇ; Fig. 4 shows circuits for the operation of normal and reverse stick control relays for the track switches; Figs. 5ᵃ and 5ᵇ, when placed end to end, with Fig. 5ᵃ on the left, show route selection circuits controlled by manual devices on the control board of Figs. 2ᵃ and 2ᵇ; Figs. 6ᵃ and 6ᵇ, when placed end to end, with Fig. 6ᵃ on the left, show a signal selection circuit network; Fig. 7 shows approach locking and release circuits for the track switches, and also shows call-on signal control circuits; Fig. 8 shows signal slotting relay circuits; and Fig. 9 shows a signal control relay network. Fig. 3 is a diagrammatic view showing a modification of the track model and interlocking control board of Figs. 2ᵃ and 2ᵇ for use in apparatus embodying our invention.

Similar reference characters refer to similar parts in each of the views.

Referring first to Figs. 1ᵃ and 1ᵇ, these drawings show a track layout comprising a plurality of track sections interconnected by track switches to form different traffic routes. As illustrated, the layout consists of a stretch of double track railway, tracks $aa$ and $bb$ of which are interconnected through a crossover $ee$ with which they are respectively joined by switches $H^2$ and $H^{2a}$, and are likewise interconnected by a crossover $ff$ with which they are respectively joined by switches $H^3$ and $H^{3a}$. Tracks $aa$ and $bb$ are also respectively joined to passing sidings $cc$ and $dd$ by switches $H^4$ and $H^1$. The reference characters $1$ and $1^a$ designate the rails of track $aa$, and the reference characters $2$ and $2^a$ designate the rails of track $bb$.

These rails are divided by insulated joints $3$ to form a plurality of track sections $a$—$A$, $A$—$ii$, $ii$—$jj$, $jj$—$E$, $E$—$E^1$, $B^1$—$B$, $B$—$mm$, $mm$—$G$, $G$—$D$, $D$—$d^1$, and $d^1$—$d^2$. Each of these track sections is supplied with current by a battery $4$ connected across the rails adjacent one end of the section. A track relay, designated by the reference character $T$ with a distinguishing exponent, is connected across the rails adjacent the opposite end of each track section.

Each track section in which a switch is located will be referred to hereinafter as a detector section. Track section $a$—$A$ in the rear of signals $S^1$, track sections $D$—$d^1$ and $d^1$—$d^2$ in the rear of signals $S^4$, and track sections $B^1$—$B$ and $E$—$E^1$ in the rear of signals $S^2$ and $S^5$, respectively, will be referred to as approach sections.

Each of the approach and detector track section relays $T^1$ to $T^{11}$, inclusive, when deenergized, controls energization of a slow-releasing relay designated by the reference character $b$ with an exponent corresponding to that of the track relay by which it is controlled. Each of the track relays $T^1$ to $T^9$, inclusive, together with its associated slow-releasing relay $b$, controls a repeater relay designated by the reference character $p$ with an exponent corresponding to that of the track relay by which it is controlled. A similar repeater relay $p^{10-11}$ is controlled by track relays $T^{10}$ and $T^{11}$ and by the associated slow-releasing relays $b^{10}$ and $b^{11}$. Each of the track relays $T$ is provided with a stick circuit including one of its own front contacts $39$, and has a pick-up circuit controlled by a front contact $40$ of its associated slow-releasing relay $b$, as shown for relays $T^1$, $T^2$, $T^{10}$ and $T^{11}$.

The repeater relay $p$, associated with the track relay $T$ for the first track section in advance of each of the groups of signals $S^1$ and $S^4$, controls, in part, a repeater stick relay designated by the reference character $U$ with an exponent corresponding with that of the repeater relay by which it is controlled.

Reference character $S$, with distinguishing exponents, designates signals which are placed at the entrances to the different routes adjacent the points $A$, $B$, $C$, $D$, $E$ and $F$, respectively, and which as here shown are of the semaphore type. Signals $S^{1a}$, $S^{1b}$ and $S^{1c}$ are mounted on a common mast $10$, and signals $S^{4a}$, $S^{4b}$ and $S^{4c}$ are mounted on a common mast $9$. Signals $S^{1a}$, $S^{1b}$, $S^{1c}$, $S^2$ and $S^3$ govern eastbound traffic movements, that is, movements which are made over the stretch of track from left to right as shown in the drawings, and signals $S^{4a}$, $S^{4b}$, $S^{4c}$, $S^5$ and $S^6$ govern westbound traffic movements, that is, movements which are made over the stretch of track from right to left as shown in the drawings.

Between the group of eastbound signals and the group of westbound signals, eleven different routes may be established according to the position of the various switches. Over each of these routes, traffic can proceed in either direction, that is, from west to east, or from east to west, as controlled by a signal for each direction of traffic over each route.

The arrangements of the switches for these various routes are as given in the following table:

Route 1.—A to E, switches $H^2$, $H^3$ and $H^4$ normal.
Route 2.—A to F, switches $H^2$, and $H^3$ normal, and $H^4$ reversed.
Route 3.—A to D, switches $H^2$ and $H^{2a}$ reversed, and $H^{3a}$ normal.
Route 4.—A to E, switches $H^2$, $H^{2a}$, $H^{3a}$ and $H^3$ reversed, and $H^4$ normal.
Route 5.—A to F, switches $H^2$, $H^{2a}$, $H^{3a}$, $H^3$ and $H^4$ reversed.
Route 6.—B to D, switches $H^1$, $H^{2a}$ and $H^{3a}$ normal.
Route 7.—B to E, switches $H^1$, $H^{2a}$ and $H^4$ normal, and $H^{3a}$ and $H^3$ reversed.
Route 8.—B to F, switches $H^1$ and $H^{2a}$ normal, and $H^{3a}$, $H^3$ and $H^4$ reversed.
Route 9.—C to D, switch $H^1$ reversed, and switches $H^{2a}$ and $H^{3a}$ normal.
Route 10.—C to E, switches $H^1$, $H^{3a}$ and $H^3$ reversed, and $H^{2a}$ and $H^4$ normal.
Route 11.—C to F, switches $H^1$, $H^{3a}$, $H^3$ and $H^4$ reversed, and $H^{2a}$ normal.

Each switch H is operated by a motor designated by the reference character M with an exponent corresponding with that of the reference character H for the switch. Each motor M may be of a fluid pressure type which is provided with a normal control magnet $nn$, a reverse control magnet $rr$, and a master control or lock magnet $q$.

Normal and reverse control magnets $nn$ and $rr$ for motor $M^4$ for operating switch $H^4$ are controlled by a neutral contact $11$ of a polarized switch control relay $m^4$ and by a polar contact $12$ of the same relay in its normal or its reverse position, respectively. Lock magnet $q$ for motor $M^4$ is controlled by back contacts of normal and reverse indication relays designated by the reference characters $i^4$ and $t^4$, respectively. The control circuits for the motor of switch $H^1$ are similar to those for motor $M^4$, and are therefore omitted from the drawing.

Normal and reverse control magnets $nn$ and $rr$ for motors $M^3$ and $M^{3a}$ for operating switches $H^3$ and $H^{3a}$, respectively, of crossover $ff$ are controlled, with the normal magnets $nn$ in series, and with the reverse magnets $rr$ in series, by a polar contact $12^{m3}$ in its normal or its reverse position, and by a neutral contact $11^{m3}$. These are contacts of a polarized switch control relay $m^3$. Lock magnets $q$ for motors $M^3$ and $M^{3a}$ are controlled in series by back contacts of normal and reverse indication relays $i^3$ and $t^3$, respectively. The control circuits for the motors for operating switches $H^2$ and $H^{2a}$ of crossover $ee$ are similar to those for motors $M^3$ and $M^{3a}$, and are therefore not shown in the drawings.

Operated in conjunction with switch $H^4$ is a pole-changer 5. A similar pole-changer is operated in conjunction with switch $H^1$. Operated in conjunction with switches $H^3$ and $H^{3a}$ are pole-changers 6 and 7, respectively. Similar pole-changers are operated in conjunction with switches $H^2$ and $H^{2a}$, respectively.

A polarized switch indication relay $h^4$ is so controlled by pole-changer 5 of switch $H^4$ that it becomes energized in the normal or the reverse direction according as switch $H^4$ is operated to, and locked in, its normal or its reverse position, respectively. A second polarized switch indication relay $h^1$ is similarly controlled in conjunction with switch $H^1$, and its control circuits are therefore omitted from the drawing. A third polarized switch indication relay $h^3$ is so controlled by a circuit including pole-changers 6 and 7 of switches $H^3$ and $H^{3a}$, respectively, in series that it becomes energized in the normal or the reverse direction according as switches $H^3$ and $H^{3a}$ are operated to, and locked in, their normal or reverse positions, respectively. A fourth polarized switch indication relay $h^2$ is similarly controlled in conjunction with switches $H^2$ and $H^{2a}$, and its control circuits are therefore omitted from the drawing.

A normal indication circuit controller shown as a relay designated by the reference character $i$, and a reverse indication circuit controller shown as a relay designated by the reference character $t$, are associated with each single switch or pair of crossover switches, and are distinguished by exponents corresponding to those of the corresponding switches. Each relay $i$ is controlled by a neutral front contact and by a normal polar contact of the polarized indication relay $h$ and of the polarized control relay $m$ for its switch, as well as by a back contact of the reverse indication relay $t$ for the same switch. Each relay $t$ is controlled by a neutral front and a reverse polar contact of the polarized indication relay $h$ and of the polarized control relay $m$ for its switch, as well as by a back contact of the normal indication relay $i$ for the same switch.

Each switch control relay $m$ is controlled by a lock relay designated by the reference character R with an exponent corresponding to that of the associated switch, and by normal and reverse switch control stick relays designated by the reference character $z$ with exponents including the letters $n$ and $r$, respectively, and also including numbers corresponding to the exponents for the associated switches. A resistor 75 is connected in multiple with the winding of each relay $m$ in order to make the relay $m$ slow in releasing.

Control circuits for relays $z$ are shown in Fig. 4.

Each lock relay R is controlled by the associated polarized switch control relay $m$, and by the associated normal and reverse switch control stick relays $zn$ and $zr$, respectively, as well as by a repeater relay $p$ or by both a repeater relay $p$ and a repeater stick relay U and by an approach locking relay designated by the reference character P with a distinguishing exponent, shown in Fig. 7, and also by one or more route locking relays designated by the reference character V with a distinguishing exponent.

Each route locking relay V is so controlled that it becomes deenergized when an approach locking relay P for a route which it controls is deenergized. Each relay V can then be reenergized if the associated relay P is again energized before a train enters its route at the signal. Each relay V, after a train enters its route while its associated signal is indicating proceed, can be reenergized only after the train has left a given portion of its route.

In each of the drawings, the contacts operated by the various relays or by the time release J, or by other control devices including the control levers and push buttons shown in Figs. 2 and 3, are identified by numbers, such numbers having distinguishing exponents when the contacts are shown elsewhere than adjacent the respective relay or release or other control device by which they are operated. The exponent for each of these contact numbers comprises the reference character and exponent for the respective relay, release, or other control device by which the associated contact is operated. For example, the exponent $p^2$ for contact $109^{p2}$ shown in a circuit for relay $V^{2w}$ in Fig. 1a comprises the reference character $p$ and its exponent 2 for repeater relay $p^2$ which operates contact $109^{p2}$. Similarly, exponent $V^{3e}$ for contact $45^{V3e}$ shown in the circuit for relay $R^4$ in Fig. 1b comprises reference character V and its exponent $3^e$ for relay $V^{3e}$ which operates contact $45^{V3e}$. Two groups of contacts are shown for time release J in Fig. 7. Different types of contacts operated by release J are distinguished by the exponents $a$ and $b$, and the contacts of release J which are shown in Fig. 7 associated with relays $P^1$ and $P^{5-6}$, and which are shown separately from release J, have the additional exponent character J.

In Figs. 2a and 2b, a combined track diagram or track model and interlocking control board is shown on which the locations of the representations of signals S with respect to the track diagram correspond to the locations of the signals with respect to the tracks shown in Figs. 1a and 1b. Indicator lamps, each of which is designated by the reference character $e$ with an exponent comprising the reference character and exponent of the signal, are shown adjacent the corresponding signal representations. Other indicator lamps, each of which is designated by the reference character $e$ with an exponent comprising the reference character and exponent of a track switch H together with the letter $n$ or $r$ indicating normal and reverse, respectively, are shown in the corresponding positions of the associated switches. Still other indicator lamps, each of which is designated by the reference character $e$ with an exponent indicative of a track section with which it is associated, are shown in the track diagram in locations corresponding to the locations of the associated track sections.

Indicator lamps $e$ associated with signals, switches, and the detector track sections are controlled by indication relays $k$ which are in turn controlled as shown in Fig. 5. Indicator lamps $e$ associated with approach track sections are controlled by back contacts of repeater relays $p$ which are controlled as already stated in connection with Figs. 1$^a$ and 1$^b$.

Manually operable devices, designated by the reference character K with distinguishing exponents, are disposed on the control board adjacent points A, B, C, D, E and F. Devices K may be rotatable levers each having a normal position $n$, a reverse position to the left $v$, and a reverse position to the right $r$. Manually operable push buttons $w^1$ and $w^4$, shown adjacent the representations of signals S$^1$ and S$^4$, respectively, are for the call-on control of these signals. Manually operable push buttons $w^G$ and $w^{ii}$ are used to provide for run-around train movements past point G. Normal and reverse manual control contacts designated by the reference character $u$ with the exponents of the switches and the letter $n$ or $r$ to indicate normal and reverse, respectively, are shown adjacent the representation of each single switch and adjacent the representations of one switch of each crossover for individually controlling the associated single switches and crossovers.

Fig. 3 shows a modification of the track model and interlocking control board of Fig. 2, in which the lamps $e$ of Fig. 2 which are associated with the track sections and switches are replaced by substantially linear but separate light sources such as neon gas tubes each designated by the reference character $c$ with an exponent corresponding to that of the lamp $e$ of Fig. 2. The energization of the neon gas tubes $c$ is controlled in the same way as the lighting of the corresponding lamps $e$ of Fig. 2.

As shown in Fig. 4, normal switch control stick relay $z^{1n}$ for controlling operation of switch H$^1$ to the normal position has a stick circuit controlled by a back contact of the associated reverse switch control stick relay $z^{1r}$, and has a pick-up circuit controlled by a front contact of a normal switch route relay designated by the reference character $f$ with the exponent 1 corresponding to that of the associated switch H$^1$. Control circuits for relays $f^1$ are shown in Fig. 5$^a$. Relay $z^{1n}$ has also a pick-up circuit controlled by normal manual control contact $u^{1n}$ shown in Figs. 2$^a$ and 3. Reverse switch control relay $z^{1r}$ for controlling operation of switch H$^1$ to the reverse position has a stick circuit controlled by a back contact of relay $z^{1n}$, and has pick-up circuits controlled by reverse switch route relay $g^1$, circuits for which are shown in Fig. 5$^a$, and by reverse manual control contact $u^{1r}$ shown in Figs. 2$^a$ and 3. The control circuits for normal and reverse stick relays $z^{4n}$ and $z^{4r}$ for switch H$^4$ are similar to those shown for relays $z^{1n}$ and $z^{1r}$, respectively, and are therefore omitted from the drawing. The control circuits for relay $z^{2n}$ are similar to those for relay $z^{1n}$ except that an additional pick-up circuit is provided which is controlled by a second normal switch route relay $f^{2a}$ for switches H$^2$ and H$^{2a}$. The control circuits for relay $z^{2r}$ are similar to those already described for relay $z^{1r}$. The control circuits for normal and reverse control stick relays $z^{3n}$ and $z^{3r}$ for switches H$^3$ and H$^{3a}$ are similar to those which are shown for relays $z^{2n}$ and $z^{2r}$, respectively, and are therefore omitted from the drawings.

In Figs. 5$^a$ and 5$^b$, route selection circuits are shown controlled by the manually controlled devices or levers K, and by push buttons $w^G$ and $w^{ii}$ of Figs. 2$^a$ and 3. Each of these route selection circuits corresponds to a given route, and includes contacts operated by levers K for the two ends of the route, a contact controlled by push button $w^G$ or $w^{ii}$, the winding of a route stick relay $y^G$ or $y^{ii}$, the winding of a normal or a reverse switch route relay $f$ or $g$, respectively, for each switch in the route, and either the winding of an indication relay $k$ together with an associated indication front contact or a resistor and associated indication back contact for each switch and detector track section of the route.

A route selection circuit for route 1 from A to E, for example, will be completed if the leverman or operator in charge places levers K$^1$ and K$^5$ in their $r$ positions and depresses push button $w^{ii}$. This circuit passes from terminal $x$ of a suitable source of current, not shown in the drawing, through contact 279$^{K1}$ in its right-hand position, resistor 320, back point of contact 321$^{X1}$, winding of relay Q$^{S1}$, contact 322$^{I1}$, winding of relay $k^2$, front point of contact 325$^{U2}$, winding of relay $f^2$, front point of contact 326$^{i2}$, winding of relay $k^{H2n}$, front point of contact 328$^{U2}$, winding of relay $k^{2b}$, contact 330$^{wii}$, winding of relay $y^{ii}$, front point of contact 332$^{P3}$, winding of relay $k^3$, front point of contact 334$^{i3}$, winding of relay $k^{H3n}$, winding of relay $f^3$, winding of relay $f^4$, front point of contact 336$^{i4}$, winding of relay $k^{H4n}$, front point of contact 338$^{P4}$, winding of relay $k^4$, resistor 343, and contact 279$^{K5}$ to terminal $o$ of the same source of current.

It will be noted that in this circuit the winding of each indication relay $k$ for a switch or for a detector track section is in series with an indication front contact. The winding of relay $k^2$ for section A—ii, for example, is in series with the front point of an indication contact 325$^{U2}$. Each of the relays $k$ for switches and detector track sections in this route will therefore be energized, causing the associated indicator lamps on the track model of Figs. 2$^a$ and 2$^b$ to become lighted, or causing the neon gas tubes on the track model of Fig. 3 to become energized. If relay U$^2$ were deenergized, the route selection circuit under discussion would include resistor 324 and the back point of contact 325$^{U2}$ instead of the winding of relay $k^2$ and the front point of this contact, and hence relay $k^2$ would be deenergized although other relays in the route selection circuit would still be energized. It is obvious that, if desired, separate front and back contacts of any given relay could be used instead of the front and back points of one contact, such as contact 325$^{U2}$, of the same relay.

The route selection circuit which has been traced also includes the winding of a signal route relay designated by the reference character Q$^{S1}$, and would also include the winding of a signal indication relay $k^{S1}$ upon energization of a signal selection relay designated by the reference character X$^1$.

Figs. 6$^a$ and 6$^b$ show signal selection circuits which become energized after corresponding signal route relays Q of Figs. 5$^a$ and 5$^b$ have become energized. Each of the signal selection circuits includes a signal selection relay designated by the reference character X with an exponent which includes the exponent of each signal which it controls. Each of the signal selection circuits also includes, in series with its signal selection relay X, a signal lock relay designated by the reference character I with an exponent corresponding to that of the relay X for an opposing signal.

Fig. 7 shows circuits for the control of approach locking relays each of which is designated by the reference character P with an exponent which includes the exponent of each signal with which it is associated. Each approach locking relay P is so controlled that it becomes deenergized when any signal with which it is associated is controlled to permit a traffic movement.

Time releasing of approach locking relays P is controlled by the time releasing device J which may be of the normally unwound clockwork type. Group releasing of approach locking relays P is provided, that is, the one release J controls the releasing of all of the relays P.

Release J is equipped with two normally open contacts 259 and 246$^J$, and with six normally closed contacts 261$^a$, 266$^b$, 268$^b$, 248$^{Ja}$, 253$^{Jb}$ and 255$^{Jb}$. Normally open contacts 259 and 246$^J$ can become closed only when release J is fully wound up.

In order to release any one of the approach locking relays P, time release J must first be wound up to open the six normally closed contacts and to close the normally open contacts 259 and 246$^J$ and thereby cause the energization of one or the other, or both, of two slow-releasing relays N$^a$ and N$^b$, respectively. Relay N$^a$ enters into the control of approach locking relays P$^{2-3}$ and P$^4$, whereas relay N$^b$ similarly enters into the control of approach locking relays P$^1$ and P$^{5-6}$.

When time release J is permitted to run down after being fully wound up, contacts 259 and 246$^J$ will open as release J leaves its fully wound position, and contacts 266$^b$, 268$^b$, 253$^{Jb}$ and 255$^{Jb}$ will close upon the lapse of a measured interval of time after the beginning of the unwinding operation. Upon the lapse of a further measured period of time, contacts 261$^a$ and 248$^{Ja}$ will also close.

Control circuits for a call-on signal relay ZZ$^1$ for signal S$^{1c}$ are also shown in Fig. 7. The control circuits for call-on signal relay ZZ$^4$ for signal S$^{4c}$ are similar to those for relay ZZ$^1$, and are therefore omitted from the drawings.

In Fig. 8, circuits are shown for relays, designated by the reference characters L$^1$ and L$^4$, which are termed signal slotting relays. Relay L$^1$ enters into the control of signal S$^{1a}$, and relay L$^4$ enters into the control of signal S$^{4a}$. Fig. 9 shows circuits which constitute what is known as a signal control relay network. A signal control relay for controlling each signal, designated by the reference character Y with an exponent corresponding to that of its signal, is controlled by these circuits.

Having described, in general, the arrangement and operation of two forms of apparatus embodying our invention, we will now trace in detail the operation of these forms of apparatus.

As shown in the drawings, all parts of the apparatus are in the normal condition, that is, each track relay T is energized by a stick circuit including its front contact 39; each relay $z^n$ is energized by a stick circuit passing from terminal $x$, through a contact 141 of the associated relay $z^r$, contact 142 of the relay $z^n$, and the winding of the relay $z^n$ to terminal $o$; each lever K is in its normal position $n$; each push button $w$ and each manually controlled contact $u$ is in its open position; release J is in its normal position in which it is shown in the drawing; each switch H is in the normal position; each signal S is in its stop position; each of the relays $b$, $t$, $z^r$, $f$, $g$, $k$, Q, $y$, X, I, N, ZZ and Y is deenergized; and each indicator lamp $e$ of Figs. 2$^a$ and 2$^b$ and neon gas tube $c$ of Fig. 3 is extinguished.

With relay T$^1$ energized and with relay $b^1$ deenergized, relay $p^1$, shown in Fig. 1$^a$, is energized by a circuit passing from terminal $x$, through the front point of contact 41 of relay T$^1$, contact 42 of relay $b^1$, and the winding of relay $p^1$ to terminal $o$. Relays $p^2$ to $p^9$, inclusive, are energized by similar circuits, although the similar circuit is shown for only relay $p^2$. With relays T$^{10}$ and T$^{11}$ energized and with relays $b^{10}$ and $b^{11}$ deenergized, relay $p^{10-11}$ is energized by a circuit passing from terminal $x$, through the front point of contact 41 of relay T$^{11}$, contact 42 of relay $b^{11}$, contact 43 of relay T$^{10}$, contact 42 of relay $b^{10}$, and the winding of relay $p^{10-11}$ to terminal $o$.

With relay $p^1$ energized, a pick-up circuit for relay P$^1$ of Fig. 7 is closed, passing from terminal $x$, through contacts 14$^{Y1a}$, 15$^{Y1b}$, 16$^{Y1c}$, 17$^{X1}$ and 18$^{p1}$, and the winding of relay P$^1$ to terminal $o$. A stick circuit is also closed for relay P$^1$, and follows the path just traced for the pick-up circuit as far as contact 17$^{X1}$, and thence passes through the front point of contact 19 of relay P$^1$ to the winding of relay P$^1$. With relays $p^5$, $p^6$ and $p^{10-11}$ energized, pick-up as well as stick circuits are closed for relays P$^{5-6}$, P$^{2-3}$ and P$^4$, respectively. These pick-up and stick circuits are similar to those just traced for relay P$^1$, and can therefore be readily traced on the drawing without further explanation.

With relays $p^2$ and P$^1$ energized, a pick-up circuit is closed for repeater stick relay U$^2$, shown in Fig. 1$^a$, passing from terminal $x$, through contact 115 of relay $p^2$, contact 116$^{P1}$, and the winding of relay U$^2$ to terminal $o$. A stick circuit for relay U$^2$ is also closed, passing from terminal $x$, through contact 115 of relay $p^2$, contact 120 of relay U$^2$, and the winding of relay U$^2$ to terminal $o$. Relay U$^9$ is also energized by similar pick-up and stick circuits which, on account of the circuits for relay U$^2$ having been traced, may be readily traced on the drawings.

With switch H$^4$ in its normal position, switch indication relay $h^4$, shown in Fig. 1$^b$, is energized in the normal direction by a circuit which includes pole-changer 5 of switch H$^4$ in its normal position. With switches H$^3$ and H$^{3a}$ in their normal positions, relay $h^3$ is energized in the normal direction by a circuit which includes pole-changers 6 and 7 of switches H$^3$ and H$^{3a}$, respectively, in their normal positions. Circuits for energizing switch indication relays $h^2$ and $h^1$ are similar to the circuits just described for relays $h^3$ and $h^4$, respectively, and are therefore omitted from the drawing.

Route locking relays V are energized by circuits which will be described hereinafter.

With relay V$^{3e}$ energized, and with relays $p^4$, P$^{5-6}$ and $z^{4n}$ energized, a pick-up circuit is closed for relay R$^4$, shown in Fig. 1$^b$, passing from terminal $x$, through contacts 44$^{p4}$, 45$^{V3e}$ and 46$^{P5-6}$, winding of relay R$^4$, contact 62$^{z4n}$, and contact 63 of relay $m^4$ in its normal or left-hand position to terminal $o$. A stick circuit for relay R$^4$ is also closed, following the path just traced for the pick-up circuit as far as the winding of relay R$^4$, and thence passing through contact 66 of relay R$^4$ to terminal $o$. A stick circuit is closed for relay R$^3$, passing from terminal $x$, through contacts 47$^{V3e}$, 48$^{V3ae}$, 49$^{V3w}$, 50$^{P4}$, 51$^{U9}$ and 52$^{p3}$, winding of relay R$^3$, and contact 66 of relay R$^3$ to terminal o. A stick circuit is closed for relay $R^2$, passing from terminal $x$, through contacts $53^{V2w}$, $54^{V2aw}$, $55^{V2ae}$, $56^{P1}$, $57^{P8}$ and $58^{U2}$, winding of relay $R^2$, and contact 66 of relay $R^2$ to terminal $o$. A stick circuit is closed for relay $R^1$, passing from terminal $x$, through contacts $59^{V2aw}$, $60^{P2-3}$ and $61^{P7}$, winding of relay $R^1$, and contact 66 of relay $R^1$ to terminal $o$. A pick-up circuit is also closed for each of the relays $R^3$, $R^2$ and $R^1$, following the stick circuit as far as the winding of each of these relays, and thence passing through a contact of an associated normal switch stick relay $z^n$ and a normal polar contact of an associated polarized switch control relay $m$ similarly to the pick-up circuit traced for relay $R^4$. Each of the relays R has also a second pick-up circuit, normally open, which follows the path of the first pick-up circuit through the winding of the relay, and thence passes through a contact of an associated reverse switch control stick relay $z^r$ and a reverse polar contact of an associated polarized switch control relay $m$.

With relays $z^{4n}$ and $R^4$ energized, a normal pick-up circuit is closed for relay $m^4$, passing from terminal $x$, through the back point of contact $67^{z4r}$, front point of contact $68^{z4n}$, front point of contact 71 of relay $R^4$ winding of relay $m^4$, front point of contact 72 of relay $R^4$, front point of contact $73^{z4n}$, and the back point of contact $74^{z4r}$ to terminal $o$. The circuits for energizing relays $m^3$, $m^2$ and $m^1$ are similar to the circuits for relay $m^4$, and are therefore omitted from the drawings.

With relay $m^4$ energized by current of normal polarity, normal control magnet $nn$ for motor $M^4$ is energized by its circuit passing from terminal $x$, through contact 11 of relay $m^4$, contact 12 of relay $m^4$ in its left-hand position, and the winding of magnet $nn$ to terminal $o$. The circuit for lock magnet $q$ of motor $M^4$ is, however, open at contact 277 of relay $i^4$, and hence motor $M^4$ is deenergized. Relays $m^3$, $m^2$, and $m^1$ are also energized by current of normal polarity, and therefore the normal control magnet $nn$ for motors M for each of the switches $H^3$, $H^{3a}$, $H^2$, $H^{2a}$, and $H^1$ is also energized. The lock magnet $q$ for these motors is, however, deenergized, and hence the motors for switches $H^3$, $H^{3a}$, $H^2$, $H^{2a}$ and $H^1$ are also deenergized.

With relays $h^4$ and $m^4$ energized in the normal direction, a circuit is completed for energizing normal indication relay $i^4$, passing from terminal $x$, through a resistor 26, contact 65 of relay $m^4$ in its left-hand position, contact 69 of relay $m^4$, contact 76 of relay $t^4$, winding of relay $i^4$, contact 78 of relay $h^4$ in its left-hand position, and contact 79 of relay $h^4$ to terminal $o$. The circuits for energizing relay $i^3$, $i^2$ and $i^1$ are similar to the circuit just traced for relay $i^4$, and are therefore omitted from the drawings.

The circuits for energizing relays $t^3$, $t^2$ and $t^1$ are similar to the circuit shown, and which will be described hereinafter, for relay $t^4$, and are therefore also omitted from the drawings.

With the various relays P, $p$, U and $i$ energized, one or more pick-up and stick circuits are closed for each of the route locking relays V. For example, a pick-up circuit for relay $V^{2ae}$ is closed, passing from terminal $x$, through contacts $80^{P2-3}$, $81^{P1}$, $83^{P7}$, $84^{P8}$, $85^{U2}$, and the winding of relay $V^{2ae}$ to terminal $o$. A second pick-up circuit is also closed for relay $V^{2ae}$ which is the same as the pick-up circuit just traced except that it includes contact $82^{12}$ instead of contact $81^{P1}$. A third pick-up circuit for relay $V^{2ae}$ is also closed, and is the same as the first pick-up circuit except that it includes contact $86^{12}$ instead of contact $85^{U2}$. A stick circuit for relay $V^{2ae}$ is closed, passing from terminal $x$, through contacts $80^{P2-3}$ and $81^{P1}$, contact 87 of relay $V^{2ae}$, and the winding of relay $V^{2ae}$ to terminal $o$. A second stick circuit for $V^{2ae}$ is also closed, and is the same as the first stick circuit except that it includes contact $82^{12}$ instead of contact $81^{P1}$.

On account of the various relays $i$, $p$ and U being energized, each of the signal slotting relays L, shown in Fig. 8, is energized. The circuit for relay $L^1$ passes from terminal $x$, through contacts $126^{12}$, $127^{14}$, $128^{U2}$, $129^{P3}$, $130^{P4}$, and $131^{P5}$, and the winding of relay $L^1$ to terminal $o$. Relay $L^4$ is energized by a similar circuit which may be readily followed on the drawings.

We will assume that the leverman or operator in charge desires to arrange for a traffic movement over route 1 from A to E. He will therefore move levers $K^1$ and $K^5$ to their right reverse positions $r$ and depress push button $w^{ii}$ as previously described, thereby completing the route selection circuit previously traced in Figs. 5a and 5b. Completion of this circuit causes energization of route stick relay $y^{ii}$, normal switch route relays $f^2$, $f^3$, and $f^4$, signal route relay $Q^{S1}$, and indication relays $k$ for each detector track section and switch of the route. Relay $y^{ii}$, upon becoming energized, completes its own stick circuit which is the same as the route selection circuit previously traced through the winding of this relay except that it includes contact 331 of relay $y^{ii}$ instead of push button contact $330^{wii}$.

On account of the normal indication relay $i$ and the normal control stick relay $z^n$ for each of the switches $H^2$, $H^3$ and $H^4$ of the route being energized, and on account of relay $P^{5-6}$ being energized, a circuit will be completed for energizing signal selection relay $X^1$ and signal lock relay $I^{5-6}$ as soon as relay $Q^{S1}$ closes its front contacts. This circuit passes from terminal $x$, through contact 389 of relay $X^{5-6}$, contact $388^{P5-6}$, winding of relay $I^{5-6}$, contacts $387^{QS6}$, $386^{QS5}$, $381^{14}$, $380^{z4n}$, $379^{i3}$, $378^{z3n}$, $377^{z2n}$, and $376^{12}$, front point of contact $375^{QS1}$, and the winding of relay $X^1$ to terminal $o$.

With relay $f^2$ energized, the pick-up circuit for relay $z^{2n}$, which includes contact $140^{f2}$, is closed. On account of relays $f^3$ and $f^4$ being energized, similar pick-up circuits are also closed for relays $z^{3n}$ and $z^{4n}$. Each of these relays is, however, already energized by its stick circuit.

Those indication relays $k$ which are energized by the route selection circuit traced cause the energization of corresponding indicator lamps $e$ of Figs. 2a and 2b or of corresponding neon gas tubes $c$ of Fig. 3. Relay $k^2$, for example, upon becoming energized, closes its contact $153^{k2}$ which completes lighting circuits for lamps $e^2$ and $e^{2a}$ for track section A—$ii$ as shown in Fig. 2a, or a circuit for energizing the neon gas tube $c^2$ as shown in Fig. 3; and relay $k^{H2n}$, upon becoming energized, closes its contact $155^{kH2n}$ for lighting the lamp $e^{H2n}$ of Fig. 2a, or for energizing the neon gas tube $c^{H2n}$ of Fig. 3.

On account of relay $X^1$ being energized, its contact $321^{X1}$ in the route selection circuit previously traced will open its back point and close its front point, thereby causing indication relay $k^{S1}$ to become energized. With relay $k^{S1}$ energized, indicator lamp $e^{S1}$ associated with signals $S^1$ will be lighted by its circuit passing from terminal $x$, through contact $152^{kS1}$, and lamp $e^{S1}$ to terminal $o$.

The energization of relay $X^1$ causes its contact $17^{X1}$ to open, thereby deenergizing approach locking relay $P^1$. Relay $P^1$, upon becoming deenergized, opens, at its contact $56^{P1}$, the pick-up and stick circuits for relay $R^2$, causing this relay to also become deenergized. Relay $P^1$, upon becoming deenergized, also opens its contact $88^{P1}$, causing relay $V^{3e}$ to become deenergized.

Relay $V^{3e}$, upon becoming deenergized, opens its contacts $47^{V3e}$ and $45^{V3e}$ in the pick-up and stick circuits for relays $R^3$ and $R^4$, respectively, causing both these relays to become deenergized.

Relay $R^4$, upon becoming deenergized, opens, at the front points of its contacts $71$ and $72$, the normal energizing circuit previously traced for relay $m^4$, and then closes, at the back points of these contacts, a normal stick circuit for relay $m^4$, passing from terminal $x$, through resistor $26$, contact $65$ of relay $m^4$ in its left-hand position, contact $69$ of relay $m^4$, back point of contact $71$ of relay $R^4$, winding of relay $m^4$, back point of contact $72$ of relay $R^4$, contact $70$ of relay $m^4$, and contact $63$ of relay $m^4$ in its left-hand position to terminal $o$. Relays $R^3$ and $R^2$, upon becoming deenergized, similarly open normal energizing circuits for relays $m^3$ and $m^2$, and close normal stick circuits for these relays. Therefore, as long as relays $R^2$, $R^3$ and $R^4$ remain deenergized, the direction of energization of relays $m^2$, $m^3$ and $m^4$ cannot be changed, but these relays will be retained energized in the normal direction by their normal stick circuits.

Relay $P^1$, upon becoming deenergized, opens its contact $81^{P1}$ in various circuits for relay $V^{2ae}$, but this relay will be retained in its energized condition by circuits through contact $82^{i2}$. Relay $P^1$, upon becoming deenergized, also opens its contact $116^{P1}$ in the pick-up circuit for relay $U^2$ which, however, remains energized by its stick circuit previously traced.

With relays $R^2$, $R^3$, $R^4$ and $V^{3e}$ deenergized, and with relay $X^1$ energized, a circuit is completed for energizing signal control relay $Y^{1a}$, this circuit passing from terminal $x$, through contacts $175^{V3e}$, $176^{P5-6}$, back point of contact $177^{X5-6}$, $178^{R4}$, $179^{i4}$, $181^{i3}$, $182^{R3}$, $183^{i2}$, and $184^{R2}$, front point of contact $185^{X1}$, contacts $186^{Nb}$, $187^{i2}$, $188^{i4}$, and $189^{L1}$, contact $190$ of relay $Y^{1b}$, and the winding of relay $Y^{1a}$ to terminal $o$. Relay $Y^{1a}$, upon becoming energized, opens its back contact $14^{Y1a}$ in the circuits for approach locking relay $P^1$ which, however, have already been opened at contact $17^{X1}$. Relay $Y^{1a}$, upon becoming energized, causes the arm of signal $S^{1a}$ to be operated to the proceed position by its circuit passing from terminal $x$, through contact $237^{Y1a}$, and the mechanism of signal $S^{1a}$ to terminal $o$.

We will now assume that, with signal $S^{1a}$ indicating proceed for a traffic movement over the route from A to E, an eastbound train arrives on approach section $a$—A, and that the operator then desires to stop the train at signal $S^{1a}$ and send it over some other route than that from A to E. The train, upon entering section $a$—A, causes relay $T^1$ to become deenergized and open its contact $41$ at the front point, which thereupon causes relay $p^1$ to also become deenergized. With relay $p^1$ deenergized, lamp $e^1$ of Fig. 2$^a$ or neon gas tube $c^1$ of Fig. 3 will be lighted by a circuit which includes contact $151^{p1}$. The operator will return lever $K^5$ to the normal position, causing all relays of the route selection circuit previously traced in Figs. 5$^a$ and 5$^b$ to become deenergized. All the lights for the route from A to E, controlled by indication relays $k$, will therefore become extinguished. With relay $Q^{s1}$ deenergized, the circuit previously traced for relay $X^1$ will be open at the front point of contact $375^{QS1}$, and hence relay $X^1$ will also be deenergized. With relay $X^1$ deenergized, contact $185^{X1}$ in the circuit traced for relay $Y^{1a}$ will be open at its front point, and hence relay $Y^{1a}$ will be deenergized. The arm of signal $S^{1a}$ will therefore move to its stop position.

On account of the train which occupies approach section $a$—A causing relay $p^1$ to be deenergized, relay $P^1$ cannot become energized by its pick-up circuit which includes contact $18^{P1}$, when the leverman returns lever $K^5$ to its normal position. In order to energize relay $P^1$, the operator will then wind release J, causing its normally closed contacts $248^{Ja}$, $253^{Jb}$, $255^{Jb}$, $261^a$, $266^b$, $268^b$ to open, and causing its normally open contacts $246^J$ and $259$ to close. Contact $246^J$ will now complete a pick-up circuit for energizing relay $N^b$, this circuit passing from terminal $x$, through contacts $14^{Y1a}$, $15^{Y1b}$, $16^{Y1c}$, $17^{X1}$, back point of contact $19$ of relay $P^1$, front point of contact $245$ of relay $P^{5-6}$, contact $246^J$, and the winding of relay $N^b$ to terminal $o$. Relay $N^b$, upon becoming energized, will complete its stick circuit which is the same as the pick-up circuit just traced except that it includes contact $247$ of relay $N^b$ instead of contact $246^J$.

After having wound release J to close contact $246^J$, the operator will permit release J to start its unwinding operation. Contacts $246^J$ and $259$ will open as soon as the unwinding operation starts. Upon the lapse of a measured period of time after the beginning of the unwinding operation, contacts $253^{Jb}$, $255^{Jb}$, $266^b$ and $268^b$ will close, but the closing of these contacts will not complete a pick-up circuit for relay $P^1$. Upon the lapse of a further measured period of time, contacts $248^{Ja}$ and $261^a$ will close.

Contact $248^{Ja}$ thereby completes a pick-up circuit for relay $P^1$ following the path of the pick-up circuit previously traced for relay $P^1$ as far as contact $17^{X1}$, and thence passing through contact $248^{Ja}$, contact $254$ of relay $N^b$, and the winding of relay $P^1$ to terminal $o$. Relay $P^1$, upon becoming energized, will complete its stick circuit previously traced. Relay $P^1$, upon becoming energized, opens, at the back point of its contact $19$, the stick circuit for relay $N^b$ which is thereby deenergized.

Relay $P^1$, upon becoming energized, completes, through its contact $56^{P1}$, the first pick-up circuit for relay $R^2$ which becomes thereby energized. Relay $P^1$ also closes its contact $88^{P1}$ in the pick-up circuit for relay $V^{3e}$, causing relay $V^{3e}$ to also become energized. Relay $V^{3e}$, upon becoming energized, completes, at its contacts $47^{V3e}$ and $45^{V3e}$, the first pick-up circuits for relays $R^3$ and $R^4$, causing these relays to again become energized.

The operator will now move lever $K^6$ to its $r$ position in order to complete the route selection circuit for route 2 from A to F. This circuit follows the path previously traced for the route selection circuit for route 1 from A to E as far as the winding of relay $f^3$, and thence passes through the winding of relay $g^4$, back point of contact $344t^4$, resistor $345$, front point of conact $346^{p4}$, winding of relay $k^{4a}$, resistor $351$, and contact $279^{K6}$ to terminal $o$.

With this route selection circuit closed, normal switch route relays $f^2$ and $f^3$ will be energized, but relay $f^4$ will now be deenergized, and reverse switch route relay $g^4$ will be energized. Relay $g^4$, upon becoming energized, completes a circuit for energizing the reverse switch control stick relay $z^{4r}$, which is similar to the circuit including contact $143^{s1}$ for energizing relay $z^{1r}$. Relay $z^{4r}$, upon becoming energized, opens, at its contact 141, the stick circuit for relay $z^{4n}$, causing relay $z^{4n}$ to be deenergized.

Relay $Q^{s1}$ will now be energized by the route selection circuit traced for route 2.

The circuit previously traced for relay $X^1$ will be open at contact $380^{z4n}$, and the branch path for the circuit for relay $X^1$ through contacts $383^{t4}$ and $382^{z4r}$ will be open at contact $383^{t4}$ until switch $H^4$ moves to its reverse position in response to the energization of relay $z^{4r}$.

With relays $z^{4r}$ and $R^4$ energized and with relay $z^{4n}$ deenergized, the reverse energizing circuit for relay $m^4$ will be completed, passing from terminal $x$, through the front point of contact $67^{z4r}$, back point of contact $73^{z4n}$, front point of contact 72 of relay $R^4$, winding of relay $m^4$ in multiple with resistor 75, front point of contact 71 of relay $R^4$, back point of contact $68^{z4n}$, and the front point of contact $74^{z4r}$ to terminal $o$.

As soon as relay $m^4$ reverses its contact 65, a second pick-up circuit will be completed for relay $R^4$, which is the same as the pick-up circuit previously traced for this relay as far as its winding, but which then passes through contact $64^{z4r}$, and contact 65 of relay $m^4$ in its right-hand position to terminal $o$. With relay $m^4$ energized in the reverse direction, the circuit previously traced for relay $i^4$ will be opened at the left-hand position of contact 65, and hence relay $i^4$ will be deenergized.

With relay $i^4$ deenergized, a circuit is now completed for lock magnet $q$ of switch motor $M^4$, passing from terminal $x$, through contact 277 of relay $i^4$, contact 278 of relay $t^4$, and magnet $q$ to terminal $o$. With relay $m^4$ energized in the reverse direction, a circuit is completed for energizing magnet $rr$ of switch motor $M^4$, passing from terminal $x$, through contact 11 of relay $m^4$, contact 12 of relay $m^4$ in its right-hand position, and the winding of reverse magnet $rr$ to terminal $o$. With lock magnet $q$ and reverse magnet $rr$ energized, motor $M^4$ will move switch $H^4$ to its reverse position, causing pole-changer 5 to be reversed.

Pole-changer 5, upon becoming reversed, causes relay $h^4$ to be energized in the reverse direction, thereby completing a circuit for reverse indication relay $t^4$, passing from terminal $x$, through resistor 26, contact 63 of relay $m^4$ in its right-hand position, contact 70 of relay $m^4$, contact 77 of relay $i^4$, winding of relay $t^4$, contact 78 of relay $h^4$ in its right-hand position, and contact 79 of relay $t^4$ to terminal $o$. Relay $t^4$, upon becoming energized, opens, at its contact 278, the circuit traced for lock magnet $q$ of motor $M^4$.

Relay $t^4$, upon becoming energized, completes a second circuit for relay $X^1$, which is the same as the circuit previously traced for this relay except that it includes the branch path through contacts $383^{t4}$ and $382^{z4r}$ instead of the path through contacts $381^{i4}$ and $380^{zn}$. Relay $X^1$, upon becoming energized by this circuit, completes a circuit for energizing relay $Y^{1c}$ which, except that it includes contact $180^{t4}$ instead of contact $179^{i4}$, is the same as the circuit previously traced for relay $Y^{1a}$ as far as contact $187^{i2}$, thence passing through contact $194^{t4}$, contact 197 of relay $Y^{1a}$, contact 198 of relay $Y^{1b}$, and the winding of relay $Y^{1c}$ to terminal $o$. With relay $Y^{1c}$ energized, the arm of signal $S^{1c}$ will be operated to its proceed position by a circuit passing from terminal $x$, through contact $237^{Y1c}$, and the mechanism of signal $S^{1c}$ to terminal $o$.

We will now assume that all parts of the apparatus have again been returned to the normal condition, and that the operator then clears signal $S^{1a}$ for a traffic movement from A to E. We will also assume that the operator clears signal $S^{4a}$ for a traffic movement from D to B. The operation of the apparatus for clearing signal $S^{4a}$ is similar to that previously described for signal $S^{1a}$, and may therefore be readily followed from the drawings.

We will assume that an eastbound train enters approach section $a$—A, and that the operator then decides to send the train over the route from A to F. He will, therefore, return the arm of signal $S^{1a}$ to its stop position, and will then wind up release J and start its unwinding operation as previously described.

We will further assume that after relay $N^b$ becomes energized, but before relay $P^1$ becomes energized, a westbound train enters section $d^2$—$d^1$, and that the operator then decides to send the westbound train over the route from D to C. He will therefore return the arm of signal $S^{4a}$ to its stop position, and will then either wait for release J to close its contact $248^{Ja}$ for energizing relay $P^1$ before he winds up the release, or he will at once wind up the release, causing relay $N^a$ to become energized by a circuit passing from terminal $x$, through contacts $33^{Y4a}$, $34^{Y4b}$, $35^{Y4c}$ and $36^{X4}$, back point of contact 38 of relay $P^4$, front point of contact 258 of relay $P^{2-3}$, contact 259 of release J, and the winding of relay $N^a$ to terminal $o$. Relay $N^a$, upon becoming energized, completes its stick circuit which is the same as the pick-up circuit just traced except including its contact 260 instead of contact 259 of release J.

The operator will then permit release J to again unwind. Upon the lapse of a measured period of time after the beginning of the unwinding operation, both contacts $248^{Ja}$ and $261^a$ of release J will close, causing relays $P^1$ and $P^4$, respectively, to become energized. The operator can then cause switches $H^4$ and $H^1$ to be reversed as previously described for switch $H^4$.

We will next assume that the operator returns the apparatus to the normal condition, and that he then again clears signal $S^{1a}$ for a traffic movement from A to E. We will also assume that an eastbound train passes through approach section $a$—A into section A—$ii$. The train, upon entering section A—$ii$, deenergizes relay $T^2$ which opens its contact 41 at the front point and causes relay $p^2$ to also become deenergized. Relay $p^2$, upon becoming deenergized, permits its contact 115 to open and thereby deenergize relay $U^2$. Relay $p^2$, upon becoming deenergized, also opens its contact $92^{p2}$, thereby preventing energization of relay $V^{3e}$ as long as the train occupies section A—$ii$.

Relay $U^2$, upon becoming deenergized, drops its contact $325^{U2}$ from the front point to the back point, thus deenergizing indication relay $k^2$ in the route selection circuit previously traced for the route from A to E in Figs. $5^a$ and $5^b$. Relay $k^2$, upon becoming deenergized, permits its contact $153^{k2}$ to open the circuit for indicator lamps $e^2$ and $e^{2a}$ of Fig. 2 or for neon gas tube $c^2$ of Fig. 3. In this way, the operator is informed that the train has entered section A—$ii$.

Relay $U^2$, upon becoming deenergized, also opens, at its front contact $128^{U2}$, the circuit traced for relay $L^1$, causing relay $L^1$ to become deenergized. Relay $L^1$ in turn opens its contact $189^{L1}$, causing relay $Y^{1a}$ to become deenergized.

The arm of signal $S^{1a}$ thereupon returns to the stop position because of the opening of contact $237^{Y1a}$.

As soon as the operator now returns either lever $K^1$ or $K^5$ to its $n$ position, causing relay $Q^{S1}$ to become deenergized and in turn also causing relay $X^1$ to become deenergized, a circuit will be completed for energizing relay $P^1$ of Fig. 7, passing from terminal $x$, through contacts $14^{Y1a}$, $15^{Y1b}$, $16^{Y1c}$ and $17^{X1}$, back point of contact $249$ of relay $ZZ^1$, contact $259^{P2}$, and the winding of relay $P^1$ to terminal $o$.

The train, upon entering section $ii$—$jj$, causes relay $T^3$ to become deenergized, which in turn causes relay $p^3$ to become deenergized. Relay $p^3$, upon becoming deenergized, will open its contact $94^{p3}$ in the pick-up circuits for relay $V^{3e}$, thus preventing this relay from becoming energized when the train leaves section A—$ii$ and permits relay $p^2$ to close its contact $92^{p2}$.

Relay $p^3$, upon becoming deenergized, permits its contact $332^{p3}$ in the route selection circuit previously traced for the route from A to E to open at its front point and to close at its back point, thereby deenergizing indication relay $k^3$. Relay $k^3$, upon becoming deenergized, permits its contact $153^{k3}$ to open the circuit for either lamp $e^3$ of Fig. $2^b$ or a corresponding neon gas tube $c^3$ similar to those shown in Fig. 3.

When the train leaves section A—$ii$, relay $U^2$ will become energized by its pick-up circuit previously traced, permitting relay $R^2$ to again become energized by its first pick-up circuit. Relays $R^3$ and $R^4$, however, will remain deenergized while relay $V^{3e}$ is deenergized.

Relay $V^{3e}$ will remain deenergized until the train leaves section $ii$—$jj$, whereupon relay $V^{3e}$ will become energized by its pick-up circuit passing from terminal $x$, through contact $88^{P1}$, contact $90^{V3ae}$ in multiple with contact $91^{l3}$, contacts $92^{p2}$ and $94^{p3}$, and the winding of relay $V^{3e}$ to terminal $o$. Upon the energization of relay $V^{3e}$, relay $R^3$ will become energized by its first pick-up circuit.

Relay $R^4$ will, however, remain deenergized until the train has passed out of section $jj$—E and has thus permitted relay $p^4$ to complete the first pick-up circuit for relay $R^4$.

If the operator permits levers $K^1$ and $K^5$ to remain in their reverse positions to the right, a train, upon entering each succeeding track section, will cause the corresponding track section indication relay $k$ to become deenergized and will thus cause the corresponding indicator lamps $e$ of Figs. $2^a$ and $2^b$ or the corresponding neon gas tubes of Fig. 3 to be deenergized. As soon as the train passes out of each section while levers $K^1$ and $K^5$ are left in their $r$ positions, the corresponding indication relay $k$ will become energized and will thereby cause the associated indicator lamp $e$ of Fig. $2^a$ or $2^b$ or the associated neon gas tubes $c$ of Fig. 3 to again be energized.

We will assume that all parts of the apparatus are again in their normal condition, and that the operator clears signal $S^{1a}$ for a train to move over route 1 from A to E. We will further assume that after a train has passed signal $S^{1a}$, but before it has passed point E, the operator desires to permit a second train to pass point A. He will therefore depress push button $w^1$, shown adjacent the representation of signals $S^1$ in Figs. $2^a$ and 3, thereby completing a pick-up circuit for energizing call-on relay $ZZ^1$, this circuit passing from terminal $x$, through contacts $138^{QS1}$, $139^{w1}$, $274^{L1}$, and the winding of relay $ZZ^1$ to terminal $o$. Relay $P^1$ of Fig. 7 is deenergized on account of relay $X^1$ being energized, and hence a stick circuit for relay $ZZ^1$ will be completed, passing from terminal $x$, through contact $272^{P1}$, contact $273$ of relay $ZZ^1$, contact $274^{L1}$, and the winding of relay $ZZ^1$ to terminal $o$.

With relay $ZZ^1$ energized, a circuit will be completed for energizing relay $Y^{1c}$, which is the same as the circuit previously traced for this relay as far as contact $186^{Nb}$, thence passing through contact $196^{ZZ1}$, contact $197$ of relay $Y^{1a}$, contact $198$ of relay $Y^{1b}$, and the winding of relay $Y^{1c}$ to terminal $o$. With relay $Y^{1c}$ energized, the arm of signal $S^{1c}$ will be caused to display a call-on indication by its circuit previously traced through contact $237^{Y1c}$.

We will next assume that all parts of the apparatus are again in their normal condition, and that the operator desires to arrange for a westbound train movement from E to A. He will therefore move levers $K^1$ and $K^5$ to their left-reverse positions $v$.

A route selection circuit will thus be completed, passing from terminal $x$, through contact $279^{K1}$ in its left-hand position, resistor $323$, winding of relay $k^2$, and thence by the path previously traced for the route selection circuit for a traffic movement from A to E as far as the winding of relay $k^4$, and then passing through contact $340^{l5-6}$, winding of relay $Q^{S5}$, back point of contact $341^{X5-6}$, resistor $342$ and contact $279^{K5}$ in its left-hand position to terminal $o$. With this circuit closed, the indication relays $k$ for the detector track sections and for the switches in the route will again be energized, causing the corresponding lamps $e$ of Figs. $2^a$ and $2^b$ or the neon gas tubes $c$ of Fig. 3 to again become energized.

It will be noted that the winding of relay $Q^{S5}$ is included in this circuit, whereas in the route selection circuit for a traffic movement from A to E, the winding of relay $Q^{S1}$ was included. Relay $Q^{S5}$, upon becoming energized, completes a circuit for energizing relays $I^1$ and $X^{5-6}$, passing from terminal $x$, through contact $373$ of relay $X^1$, contact $374^{P1}$, winding of relay $I^1$, back point of contact $375^{QS1}$, contacts $376^{i2}$, $377^{22n}$, $378^{23n}$, $379^{i3}$, $380^{24n}$, $381^{i4}$ and $384^{QS5}$, and the winding of relay $X^{5-6}$ to terminal $o$.

Relay $X^{5-6}$, upon becoming energized, causes indication relay $k^{S5}$ in the route selection circuit to become energized and complete a circuit for energizing signal control indication lamp $e^{S5}$ of Fig. $2^b$. Relay $X^{5-6}$, upon becoming energized, opens, at its contact $23^{X5-6}$, the pick-up and stick circuits for approach locking relay $P^{5-6}$, causing relay $P^{5-6}$ to become deenergized.

Relay $P^{5-6}$, upon becoming deenergized, opens its contacts $105^{P5-6}$ and $111^{P5-6}$ in the circuits for route locking relays $V^{2w}$ and $V^{3w}$, respectively, causing these relays to become deenergized. With relay $P^{5-6}$ deenergized, its contact $46^{P5-6}$ will open the circuits for relay $R^4$, causing relay $R^4$ to become deenergized. With relay $V^{2w}$ deenergized, its contact $53^{V2w}$ will be open in the circuits for relay $R^2$, causing relay $R^2$ to become deenergized, and with relay $V^{3w}$ deenergized, its contact $49^{V3w}$ will be open in the circuits for relay $R^3$, causing relay $R^3$ to also be deenergized.

With relays $V^{2w}$, $R^2$, $R^3$ and $R^4$ deenergized, and with relay $X^{5-6}$ energized, a circuit will be completed for energizing relay $Y^5$, passing from terminal $x$, through contacts $199^{V2w}$, $200^{P1}$, $185^{X1}$, $184^{R2}$, $183^{i2}$, $182^{R3}$, $181^{i3}$, $179^{i4}$ and $178^{R4}$, front point of contact $177^{X5-6}$, contacts $201^{Nb}$ and $202^{i4}$, contact $203$ of relay $Y^6$, and the winding of relay $Y^5$ to terminal $o$. With relay $Y^5$ energized, a circuit will be completed for operating the arm of signal $S^5$ to its proceed position, this circuit including contact $237^{Y5}$.

If, after a westbound train enters section $E-E^1$ and before it has passed signal $S^5$, the operator decides to send the train over some other route than the route from E to A, he will return lever $K^1$ to its normal position $n$, causing all the relays of the route selection circuit traced for the traffic movement from E to A to become deenergized. The deenergization of the indication relays $k$ will cause the corresponding lamps $e$ of Figs. 2$^a$ and 2$^b$ or neon gas tubes $c$ of Fig. 3 to become deenergized. With relay $Q^{S5}$ deenergized, relay $X^{5-6}$ will become deenergized, and relay $X^{5-6}$, upon becoming deenergized, will open the circuit for relay $Y^5$ at the front point of contact $177^{X5-6}$, causing relay $Y^5$ to become deenergized. Upon the deenergization of relay $Y^5$, the arm of signal $S^5$ will be returned to its stop position. On account of the westbound train occupying section $E-E^1$, relay $p^5$ will be deenergized, and hence contact $24^{p5}$ will be open in the normally closed pick-up circuit for approach locking relay $P^{5-6}$.

In order to cause energization of relay $P^{5-6}$, the operator will now again wind release J. When release J is fully wound up, relay $N^b$ will be energized by a second pick-up circuit passing from terminal $x$, through contacts $21^{Y5}$, $22^{Y6}$, and $23^{X5-6}$, back point of contact 245 of relay $P^{5-6}$, contact $246^J$, and the winding of relay $N^b$ to terminal $o$. Relay $N^b$, upon becoming energized, completes a stick circuit which is the same as the pick-up circuit just traced except that it includes front contact 247 of relay $N^b$ instead of contact $246^J$.

As soon as release J is fully wound up and relay $N^b$ is operated, the operator will permit the unwinding operation of this release to begin. Contacts $246^J$ and 259 will then open, and upon the lapse of a measured interval of time, contacts $266^b$, $268^b$, $253^{Jb}$ and $255^{Jb}$ will close. Contact $255^{Jb}$, upon becoming closed, completes a pick-up circuit for relay $P^{5-6}$, passing from terminal $x$, through contacts $21^{Y5}$, $22^{Y6}$, $23^{X5-6}$ and $255^{Jb}$, contact 256 of relay $N^b$, and the winding of relay $P^{5-6}$ to terminal $o$.

Relay $P^{5-6}$, upon becoming energized, opens, at the back point of its contact 245, the stick circuit previously traced for relay $N^b$. Relay $N^b$, being slow-releasing, retains its front contacts closed long enough for relay $P^{5-6}$ to complete its stick circuit which is the same as the pick-up circuit traced for relay $P^{5-6}$ as far as contact $23^{X5-6}$, thence passing through contact 25 of relay $P^{5-6}$, and the winding of relay $P^{5-6}$ to terminal $o$. Relay $P^{5-6}$, upon becoming energized, completes, at its front contact $46^{P5-6}$, the first pick-up circuit previously traced for relay $R^4$. Relay $P^{5-6}$, upon becoming energized, also completes a pick-up circuit for relay $V^{3w}$, passing from terminal $x$, through contacts $111^{P5-6}$, $112^{p3}$ and $113^{p4}$, and the winding of relay $V^{3w}$ to terminal $o$. Relay $V^{3w}$, upon becoming energized, completes its stick circuit passing from terminal $x$, through contact $111^{P5-6}$, contact 114 of relay $V^{3w}$, and the winding of relay $V^{3w}$ to terminal $o$. Relay $P^{5-6}$, upon becoming energized, also completes a pick-up circuit for relay $V^{2w}$, passing from terminal $x$, through contact $106^{P5-6}$, contact $107^{V2aw}$ in multiple with contact $108^{12}$, contact $109^{p2}$, and the winding of relay $V^{2w}$ to terminal $o$. Relay $V^{2w}$, upon becoming energized, completes a stick circuit which is the same as the pick-up circuit just traced except that it includes contact 110 of relay $V^{2w}$ instead of contact $109^{p2}$. Upon the energization of relays $V^{2w}$ and $V^{3w}$, relays $R^2$ and $R^3$, respectively, become energized by their first pick-up circuits. With relays $R^2$, $R^3$ and $R^4$ again energized, the operator can now arrange some other route for the westbound train.

We will assume that all parts of the apparatus have been again returned to the normal condition, and that the operator then desires to arrange for a run-around train movement over route 4 from A to E by reversing switches $H^2$, $H^{2a}$, $H^{3a}$ and $H^3$ and retaining switch $H^4$ in its normal position. He will therefore move levers $K^1$ and $K^5$ to their right reverse positions $r$, and will depress push button $w^G$, thereby completing a route selection circuit passing from terminal $x$, through contact $279^{K1}$ in its right-hand position, resistor 320, back point of contact $321^{X1}$, winding of relay $Q^{S1}$, contact $322^{11}$, winding of relay $k^2$, front point of contact $325^{U2}$, winding of relay $k^{2-3}$, contacts $311^{U2}$ and $312^{p8}$, resistor 313, back point of contact $314^{t2}$, winding of relay $g^2$, contact $300^{wG}$, winding of relay $y^G$, winding of relay $g^3$, back point of contact $315^{t3}$, resistor 316, front point of contact $317^{p3}$, front point of contact $318^{U9}$, winding of relay $k^{3-9}$, winding of relay $f^4$, front point of contact $336^{14}$, winding of relay $k^{H4n}$, front point of contact $333^{p4}$, winding of relay $k^4$, resistor 343, and contact $279^{K5}$ in its right reverse position to terminal $o$. This circuit, upon being completed, energizes reverse switch route relays $g^2$ and $g^3$ and normal switch route relay $f^4$ as well as indication relay $k^{H4n}$, but does not energize indication relays $k^{H2r}$ and $k^{H3r}$ until switches $H^2$, $H^{2a}$ and $H^3$, $H^{3a}$, respectively, have moved to their reverse positions in response to the energization of relays $g^2$ and $g^3$.

Relays $g^2$ and $g^3$, upon becoming energized, cause relays $z^{2r}$ and $z^{3r}$ to become energized, and switches $H^2$, $H^{2a}$ and $H^3$, $H^{3a}$, upon being operated to their reverse positions, cause relays $t^2$ and $t^3$ to become energized.

As soon as relays $t^2$ and $t^3$ become energized relays $k^{H2r}$ and $k^{H3r}$ will become energized and cause the corresponding indicator lamps $e$ of Figs. 2$^a$ and 2$^b$ or neon gas tubes $c$ of Fig. 3 to become energized. As soon as relays $t^2$ and $t^3$ have become energized, a third circuit will be completed for energizing relays $I^{5-6}$ and $X^1$, passing from terminal $x$, through contact 389 of relay $X^{5-6}$, contact $388^{P5-6}$, winding of relay $I^{5-6}$, contacts $387^{QS6}$, $386^{QS5}$, $383^{t4}$, $382^{z4r}$, $372^{t3}$, $371^{z3r}$, $370^{z2r}$, $369^{t2}$, front point of contact $375^{QS1}$, and the winding of relay $X^1$ to terminal $o$.

Relay $X^1$, upon becoming energized, opens its contact $17^{X1}$, thereby deenergizing approach locking relay $P^1$ as previously described. Relay $X^1$, upon becoming energized, also opens its contact $321^{X1}$ at the back point and closes this contact at the front point, thereby causing signal control indication relay $k^{S1}$ to become energized. Relay $k^{S1}$, upon becoming energized, closes its contact $152^{kS1}$, thus causing lamp $e^{S1}$ of Fig. 2 to become lighted as previously described.

Relay $P^1$, upon becoming deenergized, permits its contact $88^{P1}$ to open, thereby deenergizing relay $V^{3e}$ as previously described. With relays $P^1$ and $V^{3e}$ deenergized, relays $R^2$, $R^3$ and $R^4$ will be deenergized as also previously described, thus preventing change in direction of energization of relays $m^2$, $m^3$ and $m^4$.

As soon as relays $R^2$, $R^3$ and $R^4$ become deenergized, a third circuit will be completed for energizing signal control relay $Y^{1c}$, this circuit passing from terminal $x$, through contacts $175^{V3e}$, $176^{P5-6}$, back point of contact $177^{X5-6}$, $178^{R4}$, $180^{t4}$, $207^{t3}$, $216^{R3}$, $215^{R2}$, $206^{t2}$ and $184^{R2}$ front point of contact $185^{X1}$, contacts $186^{Nb}$, $191^{t2}$, and $195^{t3}$, contact $197$ of relay $Y^{1a}$, contact $198$ of relay $Y^{1b}$, and the winding of relay $Y^{1c}$ to terminal $o$. With relay $Y^{1c}$ energized, the arm of signal $S^{1c}$ will be operated to its proceed position by its circuit including contact $237^{Y1c}$.

We will now assume that all parts of the apparatus are again returned to the normal condition, and that the operator then desires to arrange the switches for a traffic movement over route 3 from A to D, but that he desires to hold all signals in the stop position. This can be accomplished by any one of three methods, namely:

1. By moving lever $K^1$ to the left, and lever $K^4$ to the right.
2. By moving lever $K^1$ to the right, and lever $K^4$ to the left.
3. By controlling the track switches individually, by operation of the manual control contacts $u$. Since switch $H^{3a}$ is already in the normal position, it will only be necessary to close manually controlled contact $u^{2r}$ for causing switches $H^2$ and $H^{2a}$ to be reversed.

If the operator uses either the first or the second method, the indicators for the detector track sections and the switches of the route will become energized, whereas if he uses the third method, closing contact $u^{2r}$, the indicators will not be energized.

If the operator uses the first method for arranging the switches for the route from A to D and at the same time holding the signals in the stop position, he will complete a circuit passing from terminal $x$, through contact $279^{K1}$ in the left reverse position, resistor $323$, winding of relay $k^2$, front point of contact $325^{U2}$, winding of relay $k^{2-8}$, front points of contacts $311^{U2}$ and $312^{P8}$, resistor $313$, back point of contact $314^{t2}$, winding of relay $g^2$, push button contact $300^{wG}$, winding of relay $y^G$, winding of relay $f^{3a}$, front point of contact $302^{13}$, winding of relay $k^{H3an}$, front point of contact $304^{U9}$, winding of relay $k^9$, resistor $309$, and contact $279^{K4}$ in its right-hand position to terminal $o$. It will be noted that, by this circuit, relays $k^2$, $k^{2-8}$, $g^2$, $y^G$, $f^{3a}$, $k^{H3an}$, and $k^9$ will be energized. The indicators controlled by the energized relays $k$ will thereupon become energized. With relay $g^2$ energized, relay $z^{2r}$ will become energized and $z^{2n}$ will become deenergized, causing relay $m^2$ to be energized in the reverse direction, which in turn will cause switches $H^2$ and $H^{2a}$ to be operated to their reverse positions. With these switches in their reverse positions, relay $t^2$ will become energized and will thus complete, at the front point of its contact $314^{t2}$, the path through winding of relay $k^{H2r}$, causing the indicator $e^{H2r}$ controlled by this relay to become energized. Since the signal route relays $Q^{S1}$ and $Q^{S4}$ for the two ends of this route are deenergized, neither relay $X^1$ nor $X^4$ will become energized, and hence neither signal $S^{1b}$ nor signal $S^{4b}$ will be cleared.

If the operator uses the second method by moving lever $K^1$ to the right reverse position and lever $K^4$ to the left reverse position, the operation of the switches and indicator lamps will be accomplished as just described, but the route selection circuit by which this is accomplished will now pass from terminal $x$, through contact $279^{K1}$ in its right-hand position, resistor $320$, back point of contact $321^{X1}$, winding of relay $Q^{S1}$, contact $322^{I1}$, winding of relay $k^2$, and thence by the path previously traced for the first method as far as the winding of relay $k^9$, thence through contact $306^{I4}$, winding of relay $Q^{S4}$, back point of contact $307^{X4}$, resistor $308$, and contact $279^{K4}$ in the left-hand position to terminal $o$. Since both relays $Q^{S1}$ and $Q^{S4}$ are now energized, contacts $375^{QS1}$ and $366^{QS4}$ will both be closed at their front points, and hence no current can flow from terminal $x$ through either relay $X^1$ or $X^4$, and therefore signals $S^{1b}$ and $S^{4b}$ for the route will both remain in the stop position as before.

If the operator uses the third method for arranging the route from A to D, he will cause relay $z^{2r}$ to be energized by a circuit passing from terminal $x$, through contact $u^{2r}$, and the winding of relay $z^{2r}$ to terminal $o$. Relay $z^{2r}$, upon becoming energized, will open its contact $141$, thereby causing relay $z^{2n}$ to become deenergized. With relay $z^{2r}$ energized and relay $z^{2n}$ deenergized, the winding of relay $m^2$ will be energized in the reverse direction, and switches $H^2$ and $H^{2a}$ will therefore be operated to their reverse positions. Indication relays $k$ will, however, remain deenergized, and hence none of the indicators $e$ of Figs. $2^a$ and $2^b$ nor $c$ of Fig. 3 will be energized.

We have described, for a few typical traffic movements, the operation of two forms of apparatus embodying our invention. From those descriptions of operation and from the preceding general description, operation of each of the two forms of apparatus for every other possible traffic movement will be readily understood by reference to the drawings.

Apparatus embodying our invention although adapted to control any track layout likely to be encountered in practice is shown for convenience arranged to control a layout similar to that shown in the Spray application hereinbefore referred to, including switches which can be arranged for eleven different routes. Traffic movements can be made in either direction over each of these routes.

One form of apparatus embodying our invention includes a track model and interlocking control board, shown in Figs. $2^a$ and $2^b$, having mounted in the tracks of the diagram different series of lamps $e$ for indicators. A second form of apparatus embodying our invention differs from the first form only by including a track model and interlocking control board, shown in Fig. 3, on which are provided indicators of linear form comprising neon gas tubes $c$ for indicating a route by a substantially continuous line instead of by a series of points as when the lamps $e$ shown in Figs. $2^a$ and $2^b$ are employed.

In each of these two forms of apparatus, shown in the accompanying drawings, a manually operable control lever or route button of the rotary type is provided for each route end or signal location. Manually operable push button circuit controllers are also provided for points intermediate the opposing signals when the track layout provides alternative routes between the same route ends and run-around traffic movements are to be arranged for. Each control lever has three positions, comprising a normal or middle position $n$, a reverse position to the right $r$ for arranging the switches and for clearing the eastbound signal for the route, and a reverse position $v$ to the left for arranging the switches for the route and for the clearing of the westbound signal for the route.

In order to arrange the switches of each route in the positions required for the route and in order to clear the eastbound signal for the route, the operator will place the two levers for the route in their right reverse positions and depress the intermediate push button $w$ for the route. Similarly, in order to arrange the switches of each route in the positions required for the route and in order to clear the westbound signal for the route, the operator will place the two levers for the route in their left reverse positions and depress the intermediate push button $w$ for the route. In order to arrange the switches of each route in the positions required for the route but to hold the signals for the route in the stop position, the operator will place the levers for the two ends of the route in opposite positions, that is, one lever will be placed in the left reverse position, while the other is placed in the right reverse position, and the push button for the intermediate point of the route will be depressed.

Separate normal and reverse manual control devices $u$ are provided for each single switch and for each pair of crossover switches for separately causing operation of the corresponding single switches and pairs of crossover switches.

The indicators $e$ provided on the control board shown in Figs. 2$^a$ and 2$^b$, and the indicators $c$ provided on the control board shown in Fig. 3 are normally deenergized. The indicators for the detector track sections in a route and for each switch already occupying the required position will become energized as soon as the operator arranges the levers for the two ends of the route which he desires to set up, so that an illuminated line or series of lights will appear on the track diagram to correspond with the proposed route, with a gap in the illumination at the location of each switch which requires to be operated to a different position. As the switches complete their operation, the gaps are filled in, so that a substantially continuous line or a full series of lights appears when the route is fully established, at which time the indicator for the signal at the entrance to the route is also lighted, provided the levers have been moved to corresponding positions in order to clear the signal. The indicator lamps associated with the signals governing traffic movements from right to left can become energized only when the operator arranges both levers for the route in their left reverse positions, while those for signals governing traffic movements from left to right can become energized only when the operator places both levers for the route in their right reverse positions. When a train enters an established route the continuity of the illuminated line or series of lights is again interrupted, the switch section and entrance signal lamps remaining lighted while the lamps for each track section are extinguished as long as the train occupies such section, thereby indicating the progress of the train over the route, the illumination of all sections of the representation of the route being cancelled upon the restoration of the route levers to normal.

Although we have herein shown and described only two forms of interlocking control apparatus embodying our invention, it is understood that various changes and modifications may be made therein within the scope of the appended claims without departing from the spirit and scope of our invention.

Having thus described our invention, what we claim is:

1. In an interlocking control system for a plurality of railway tracks interconnected by switches to form a plurality of routes, a normal and a reverse control relay for each of said switches, a manually operable lever for each route end, a route relay for each route end, a plurality of circuits corresponding to said routes one for each direction of traffic movements over each of said routes and each of which includes in series the control element of the normal or the reverse control relay for each switch in the corresponding route and also a contact controlled by the manually operable lever for each end of the route as well as the control element of the route relay at the end of the circuit which corresponds to the entrance end of the route for the direction of traffic movements with which the circuit is associated and also a source of current for operating the relays of the circuit, means controlled by the normal and reverse control relays for each switch for operating the corresponding switch to normal and reverse positions respectively, a signal for each route end, and means controlled by said route relays for operating said signals.

2. In combination, a plurality of railway tracks interconnected by switches to form a plurality of routes, a signal for each direction of traffic movements over each of said routes for governing traffic movements in the corresponding direction over each route, a manually operable route lever for each route end having a first and a second position, means controlled by both levers for each route for arranging the switches of the corresponding route so that each switch will be in the position required by the route if both levers are placed in the first position or if both levers are placed in the second position as well as if one of said levers is placed in the first position and the other is placed in the second position, means controlled by both levers for each route for clearing the signal for one direction of traffic movements over the route if and only if both levers are placed in the first position, and means controlled by both levers for each route for clearing the signal for the opposite direction of traffic movements over the route if and only if both levers are placed in the second position.

3. In an interlocking control system for a plurality of railway tracks interconnected by switches to form a plurality of routes, a normal and a reverse control relay for each of said switches, a normal and a reverse indication relay for each of said switches, a normal and a reverse contact for each switch each controlled by its switch in the corresponding position, a plurality of interconnected circuits each of which corresponds to one of said routes and each of which includes either a normal control relay in series with a normal indication relay and a normal contact or a reverse control relay in series with a reverse indication relay and a reverse contact for each switch in its route and also includes a manually controlled contact and a source of current for operating the relays in the circuit, means controlled by the normal and reverse control relays for each switch for operating the corresponding switch to normal and reverse positions respectively, and normal and reverse indication means for each switch controlled by the normal and reverse indication relays for the same switch in accordance with the condition of the normal and reverse contacts respectively for that switch.

4. In an interlocking control system for a plurality of railway tracks interconnected by switches to form a plurality of routes, a normal and a reverse indication relay for each of said switches, a normal and a reverse indication contact for each switch each controlled by its switch in the corresponding position, a plurality of interconnected route circuits each of which corresponds to one of said routes and each of which includes either a normal indication relay and a normal indication contact or a reverse indication relay and a reverse indication contact for each switch in its route and also includes a manually controlled contact and a source of current for operating the relays in the circuit, means controlled by each route circuit for arranging all the switches of the corresponding route in the positions required for the route, and normal and reverse indication means for each switch controlled by the normal and reverse indication relays for the same switch in accordance with the condition of the normal and reverse indication contacts respectively for the associated switch.

5. In an interlocking control system for a plurality of railway tracks interconnected by switches to form a plurality of routes, a plurality of interconnected route circuits each of which corresponds to one of said routes and each of which includes means controlled by each switch in its route, manually controlled means for energizing each of said route circuits, means controlled by each of said route circuits for arranging all the switches of the corresponding route in the positions required for the route, and indication means for each switch of each route controlled by the corresponding route circuit in accordance with the means in the route circuit controlled by the associated switch.

6. In an interlocking control system for a plurality of railway tracks interconnected by switches to form a plurality of routes, an indication circuit controller for each switch for each route in which the switch is included having a front and a back contact, means controlled by each switch for closing the front contact of each of its indication circuit controllers when the switch occupies the position required for the associated route and for at other times closing the back contact of each of its indication circuit controllers, an indication relay for each of said indication circuit controllers, a plurality of interconnected route circuits each of which corresponds to one of said routes and includes either the winding of the indication relay and the front contact of the associated indication circuit controller or a resistor and the back contact of the same indication circuit controller for each switch in the associated route, manually controlled means for energizing each of said route circuits, means controlled by each of said route circuits for arranging all the switches of the corresponding route in the positions required for the route, and indication means controlled by each of said indication relays.

7. In combination, a plurality of railway tracks divided into sections and interconnected by switches to form a plurality of routes, a track circuit for each of said sections each including a track relay, a front and a back contact operated by each of said track relays, an indication relay for each of said track relays, a plurality of interconnected route circuits each of which corresponds to one of said routes and includes either the winding of an indication relay for each track relay for its route and the front contact of the associated track relay or a resistor and the back contact of the same associated track relay, manually controlled means for energizing each of said route circuits, means controlled by each of said route circuits for arranging the switches of the corresponding route in the positions required for the route, and indication means controlled by each of said indication relays.

8. In an interlocking control system for a plurality of railway tracks interconnected by switches to form a plurality of routes, a signal for each of said routes for governing traffic movements over the associated route, a plurality of signal selection relays for said routes, a front contact for each of said signal selection relays which is closed when its relay is energized and a back contact for each of said signal selection relays which is closed when its relay is deenergized, means for energizing each of said signal selection relays if and only if the associated routes are in condition for the associated signals to be cleared, a signal indication relay for each of said signals, a plurality of interconnected route circuits each of which corresponds to one of said routes and includes either the winding of the signal indication relay for its route and the front contact of the associated signal selection relay or a resistor and the back contact of the same signal selection relay, manually controlled means for energizing each of said route circuits, means controlled by each of said route circuits for arranging the switches of the corresponding route in the positions required for the route and for clearing the signal for the same route, and signal indication means controlled by each of said signal indication relays.

9. In combination, an electrical device, an indication relay, a front and a back contact operated by said relay, means for at times energizing said relay, a second indication relay, a circuit including either the winding of said second indication relay and said front contact or a resistor and said back contact for energizing said electrical device when either said front or said back contact is closed and for energizing said second indication relay only if said front contact is closed, manually controlled means for energizing said circuit, and indication means controlled by said second indication relay.

10. In combination, a railway traffic governing device operable to a given condition or position, an indication relay, a front and a back contact operated by said relay, means controlled by said traffic governing device when in said given condition or position for energizing said indication relay, a second indication relay, a circuit including either the winding of said second indication relay and said front contact or a resistor and said back contact, manually controlled means for energizing said circuit, means controlled by said circuit for operating said traffic governing device to its said given condition or position, and indication means controlled by sad second indication relay.

11. In combination, a railway traffic governing device for governing traffic movements over a given stretch of railway track, a track circuit for said stretch of track including a track relay, a front and a back contact controlled by said track relay, an indication relay, a circuit including either the winding of said indication relay and said front contact or a resistor and said back contact, manually controlled means for energizing said circuit, means controlled by said circuit for operating said traffic governing device, and indication means controlled by said indication relay.

12. In an interlocking control system for a plurality of railway tracks interconnected by switches to form a plurality of routes, a manually controlled device for each end of each route and for given intermediate points, a stick relay for each of said given intermediate points, a plurality of interconnected route circuits each of which corresponds to one of said routes and is controlled by the manually controlled device for each end of its route and includes the control element of a said stick relay for an intermediate point as well as either the associated manually controlled device for the intermediate point or a front contact of said stick relay, and means controlled by each of said route circuits for arranging all the switches of the associated route in the positions required for the route.

13. In an interlocking control system for a plurality of railway tracks interconnected by switches to form a plurality of routes, a normal and a reverse control relay for each of said switches, a plurality of interconnected route circuits each of which corresponds to one of said routes and includes in series the control element of the normal or the reverse control relay for each switch in the corresponding route, manually controlled means for supplying current to each of said route circuits for energizing said normal and reverse control relays, a normal and a reverse manual control contact for each of said switches, a normal and a reverse stick relay for each of said switches, a pick-up circuit for each normal stick relay controlled by a front contact of the normal control relay for the associated switch, a second pick-up circuit for each normal stick relay controlled by the normal manual control contact for the same switch, a first and a second pick-up circuit for each reverse stick relay controlled by a front contact of the reverse control relay and by the reverse manual control contact respectively for the associated switch, a stick circuit for each normal stick relay controlled by a back contact of the associated reverse stick relay, a stick circuit for each reverse stick relay controlled by a back contact of the associated normal stick relay, and means controlled by each normal and reverse stick relay for operating the associated switch to its normal and reverse positions, respectively.

14. In an interlocking control system for a plurality of railway tracks divided into sections and interconnected by switches to form a plurality of routes, signals located adjacent said tracks for governing traffic movements over said routes, miniature representations of said tracks and switches and signals so placed relatively to each other as to form an approximate model of the arrangement of said tracks and switches and signals, a manually operable control device for each end of each route mounted on said model adjacent the representation of the associated end of its route, a track section indicator lamp for each track section mounted on said model at the representation of its section and controlled by traffic conditions in said section, a normal and a reverse switch indicator lamp for each switch mounted on said model at the representation of the associated switch and controlled by the associated switch in its normal and reverse positions, respectively, a signal indicator lamp for each signal mounted on said model at the representation of its signal and controlled in accordance with the control of its signal, means controlled by the two control devices for each route for arranging all the switches of the route in the positions required for the route and for clearing a signal for the route, means controlled by the two control devices for each route for lighting the track section indicator lamps and the switch indicator lamps for the associated route only if the two control devices are operated for arranging the switches for the route, and means controlled by the two control devices for each route for lighting the signal lamp for the associated route only if the two control devices are operated for clearing the signal for the route.

15. In an interlocking control system for a plurality of railway tracks divided into sections and interconnected by switches to form a plurality of routes, a plurality of signals for governing traffic movements over said routes, a track section indicator for each track section controlled by traffic conditions in the associated section, a normal and a reverse switch indicator for each switch controlled to indicate the position of the associated switch, a signal indicator for each signal controlled to indicate the condition of control of its signal, manually controllable apparatus for arranging all the switches of each route in the positions required for the route and for clearing a signal for the route, means controlled by said manually controllable apparatus for energizing the track section indicators and the switch indicators for each route only when said manually controllable apparatus is put in condition for arranging the switches of the associated route in the positions required for the route, and means controlled by said manually controllable apparatus for energizing a signal indicator only when said manually controllable apparatus is put in condition for clearing a signal for the route.

16. In an interlocking control system for a plurality of railway tracks divided into sections and interconnected by switches to form a plurality of routes, a track section indicator for each track section controlled by traffic conditions in the associated section, a normal and a reverse switch indicator for each switch controlled to indicate the position of the associated switch, manually controllable apparatus for arranging all the switches of each route in the positions required for the route, and means controlled by said manually controllable apparatus for energizing the track section indicators and the switch indicators for each route only when said manually controllable apparatus is put into the condition for arranging the switches of the associated route in the positions required for the route.

17. In an interlocking control system for a plurality of railway tracks divided into sections and interconnected by switches to form a plurality of routes, miniature representations of said tracks and switches comprising switch sections of neon gas tubes to represent the switches and track repeater sections of neon gas tubes for other portions of said tracks so placed relatively to each other as to form an approximate model of the arrangement of said tracks and switches, means controlled by the switches in normal and reverse positions for energizing corresponding switch sections of neon gas tubes, and means controlled by traffic conditions in the various track sections for controlling corresponding track repeater sections of neon gas tubes.

18. In an interlocking control system for a plurality of railway tracks divided into sections and interconnected by switches to form a plurality of routes, manually controllable means for arranging said switches in the positions required for said routes, miniature representations of said track sections comprising sections of neon gas tubes so placed relatively to each other as to form an approximate model of the arrangement of said tracks, and means controlled by said manually controllable means and by traffic conditions in said track sections for at times lighting the corresponding sections of neon gas tubes.

19. In an interlocking control system for a plurality of railway tracks divided into sections and interconnected by switches to form a plurality of routes, a plurality of signals for governing traffic movements over said routes, manually controllable means for arranging said switches in the positions required for said routes and for clearing said signals, miniature representations of said track sections comprising sections of neon gas tubes so placed relatively to each other as to form an approximate model of the arrangement of said tracks, and means controlled by said manually controllable means for at times lighting each of said neon gas tube sections only under given traffic conditions in the corresponding track section.

20. In an interlocking control system for a plurality of railway tracks interconnected by switches to form a plurality of routes, miniature representations of said tracks so placed relatively to each other as to form an approximate model of the arrangement of said tracks, miniature representations of said switches comprising sections of neon gas tubes placed in locations relative to said track representations to correspond to the locations of said switches in relation to said railway tracks, and means controlled by said switches for selectively lighting said neon gas tubes according as said switches are in their normal or reverse positions.

21. In combination, a stretch of railway track divided into an approach section and a detector section, a switch in said detector section, a signal for governing traffic movements from said approach section into said detector section, a repeater relay so controlled by traffic conditions in said approach section as to be slow to pick up when said approach section becomes unoccupied, a locking relay, a pickup circuit for said locking relay closed only if said signal is controlled to indicate stop and including a front contact of said repeater relay whereby said locking relay will not become energized in event of a momentary loss of shunt of said approach section while said approach section is occupied, a stick circuit for said locking relay closed only if said signal is controlled to indicate stop, and means controlled in part by a front contact of said locking relay for controlling operations of said switch.

22. In combination, a stretch of railway track divided into an approach section and a detector section, a switch in said detector section, a signal for governing traffic movements from said approach section into said detector section, an approach track circuit including a track relay for said approach section, a repeater relay, a slow release relay, a circuit including a back contact of said track relay for energizing said slow release relay, a pickup circuit for said track relay including a front contact of said slow release relay, a stick circuit for said track relay which is the same as its pickup circuit except including a front contact of its own instead of the front contact of the slow release relay, a circuit including a front contact of said track relay and a back contact of said slow release relay for energizing said repeater relay, an approach locking relay, a pickup circuit for said approach locking relay controlled by a front contact of said repeater relay whereby said approach locking relay will not become energized in the event of a momentary loss of shunt of said approach track circuit, a stick circuit for said approach locking relay closed only if said signal is controlled to indicate stop, and means controlled in part by said approach locking relay for operating said switch if said approach locking relay is energized.

23. In an interlocking control system for a plurality of railway tracks divided into sections and interconnected by switches to form a plurality of routes, manually controllable means for arranging said switches in the positions required for said routes, miniature representations of said track sections comprising a plurality of portions provided with substantially linear light sources so placed relatively to each other as to form an approximate model of the arrangement of said tracks, and means controlled by said manually controllable means and by traffic conditions for at times illuminating selected ones of said portions to visually indicate by a substantially continuous illuminated line the available route over said tracks.

24. In combination, a stretch of railway track comprising a main track and a branch track connected to a single track by a track switch, a track diagram comprising a plurality of portions provided with substantially linear light sources and adapted to form an illuminated representation of said stretch, switch control means for operating the track switch, and means controlled by said switch control means for illuminating the main track or the branch track of said diagram in accordance with the position of the track switch and for also illuminating the single track of said diagram, to visually indicate by a substantially continuous illuminated line the available route over said switch.

25. In combination, a stretch of railway track comprising a main track and a branch track connected to a single track by a track switch, a track diagram comprising a plurality of portions provided with substantially linear light sources and adapted to form an illuminated representation of said stretch, two signals selectively controlled in accordance with the position of the track switch for governing the movement of traffic through said stretch, and means rendered effective when either signal has been cleared to illuminate the main track or branch track and to also illuminate the single track of said diagram to visually indicate by a substantially continuous illuminated line the route which such signal governs.

26. In combination, a track layout comprising a plurality of track sections adapted to be interconnected by track switches to form different traffic routes, a track diagram comprising a plurality of portions provided with substantially linear light sources and adapted to form an illuminated representation of said track layout, a track relay for each track section, indication means for indicating the position and locked condition of the track switches, means controlled by each track relay for illuminating one or more portions of said diagram, and means controlled by said indication means for illuminating the adjoining portions of said diagram, to indicate by a substantially continuous illuminated line the available route through said track layout.

27. In an interlocking system for railroads, a track layout comprising a plurality of track sections adapted to be interconnected by track switches to form different traffic routes, a plurality of signals for governing the movement of traffic through said layout in opposite directions, a track diagram provided with a plurality of lamps for displaying an illuminated representation of each different track route through said layout, route control means for each route effective when actuated to operate one or more of the track switches as required to establish said route through the track layout and to clear the signal for a selected direction to permit a traffic movement over said route, means effective upon actuation of said control means to light certain of said lamps to indicate the portions of said route that are already established, means rendered effective when the operated switches assume their operated positions to light certain other lamps of said diagram to indicate a complete route as soon as said route is fully established, and means for lighting an additional lamp to indicate which traffic direction has been established.

28. In an interlocking system for a plurality of railway tracks interconnected to form a plurality of routes, a manually controllable entrance contact and a manually controllable exit contact for each end of each route, an indicating lamp associated with each of said entrance and exit contacts, means effective upon the closing of an entrance contact and an exit contact for establishing the route defined by said contacts, and means controlled by both of the operated entrance and exit contacts for lighting each of the indicating lamps associated with the operated contacts.

29. In an interlocking system for a plurality of railway tracks interconnected to form a plurality of routes, a manually controllable entrance contact and a manually controllable exit contact for each end of each of said routes, an indicating lamp associated with each of said entrance and exit contacts, means controlled by the closing of the entrance contact for a given end of each route and of the exit contact for the opposite end of each route for establishing the corresponding route, means controlled by the closing of the exit contact for said given end of each route and of the entrance contact for the opposite end of each route for also establishing the corresponding route, and means controlled by the closing of both the entrance and exit contacts of each pair of contacts for lighting each of the indicating lamps associated with the same pair.

30. In an interlocking system for railroads, a track layout made up of sections of track interconnected by track switches to form a plurality of routes with signals governing traffic at the entrances to such routes, route establishing means for setting up each route by operating the track switches in such route and clearing its respective signal, a miniature track diagram having route portions corresponding to the sections of said track layout which route portions may be selectively illuminated, and means for selectively illuminating those of said route portions for a route actually set up by said route establishing means, said means also acting to illuminate such route portions for that route so long as it is occupied by a train.

31. In an interlocking system for railroads, a track layout made up of sections of track interconnected by track switches to form a plurality of routes with signals governing traffic at the entrances to such routes, manually governed means for setting up each route by operating the track switches in such route and clearing its respective signal, a miniature track diagram corresponding to said track layout and made up of route portions which may be selectively illuminated, and means for selectively illuminating those of said route portions corresponding to a route actually set up by said manually governed means whether or not said route is occupied by a train, whereby an operator is warned against endeavoring to set up a route conflicting with a route already set up.

32. In combination, a track layout including two track sections connected by a track switch, a control panel having said track layout represented thereon by two miniature track sections connected by a track switch, a normal indicator representing one of said miniature track sections, a reverse indicator representing the other of said miniature track sections, manually operable control means for causing the normal and reverse operation of said track switch, means governed by said manually operable control means for selectively energizing said normal or reverse indicator when said manually operable control means is causing a corresponding normal or reverse operation of said track switch, and means for distinctively energizing said normal or reverse indicator to give a different indication depending upon the position of said track switch when a route has been set up over such track switch in response to said manually operable control means.

33. In combination; a track layout having track sections connected by track switches with signals for governing traffic thereover; a panel having said track layout represented thereon by portions of miniature trackway for each of said track sections, said portions being interconnected in a manner indicative of said track switches; manually operable control means on said panel for the ends of said sections; route establishing means responsive to said manually operable control means for the opposite ends of a section to operate the track switches to set up a route over said section and clear a signal therefor; means for illuminating the miniature trackway portion corresponding to the track section over which said route establishing means is setting up a route; and means for distinctively illuminating the miniature trackway portion corresponding to the track section over which a route is actually set up; whereby a proposed route is clearly distinguishable from a route actually set up.

34. A track layout including two portions of track connected by a track switch, a control panel having thereon a representation in miniature of said track portions and said connecting track switch, normal and reverse indicators comprising substantially linear strips of translucent material in the portions of track represented on said track diagram and corresponding with the normal and reverse positions of said switch, manually operable buttons on said control panel for the ends of said track portions, route establishing means effective upon the operation of a button for the entrance end of a track portion and a button for the opposite exit end of that track portion for causing the normal or reverse operation of said track switch in the track layout as required to set up a route, and means controlled by said route establishing means in response to the operation of said buttons and dependent upon the operated position of said track switch for illuminating said normal or said reverse indicator when a route has been set up over the track switch in the corresponding position and for also illuminating said indicator while said route is occupied by a train.

35. A switch and signal control system for railroad track layouts having a plurality of power-operated switch points movable to different positions to provide various routes for train movement from one signal location to another, certain of said routes being conflicting and others non-conflicting comprising, in combination with a control panel having thereon a miniature track diagram of the track layout, manually operable buttons located on said track diagram adjacent the signal locations represented thereon, route establishing means including a plurality of route circuits each individually belonging to a corresponding one of the desired routes through said track layout, said route establishing means being responsive to the joint operation of the two buttons belonging to the signal locations at the ends of any given desired route to energize the corresponding route circuit, means responsive to the energization of any given route circuit for preventing the energization of the route circuits for all other conflicting routes, switch and signal control means responsive to the energization of a given route circuit for positioning the switch points for that route and for also controlling the clearing of a signal for train movement over that route, indicating means associated with said track diagram for illuminating linear portions of the track represented thereon of substantial length adjacent the switch points, and means responsive to the energization of a given route circuit and dependent upon the operated position of the switch points for controlling said indicating means to outline the corresponding route by illuminating a substantial part of the track on said track diagram to show the position of the switch in that route.

36. In a switch and signal control system for railroad track layouts having a plurality of power-operated switch points movable to provide a plurality of routes between signal locations, certain of said routes being conflicting, a control panel having thereon a miniature track diagram of the track layout, manually operable buttons on said diagram adjacent the signal locations represented thereon, switch control means energizable to normal or reverse conditions for governing the operation of said switch points to corresponding normal or reverse positions, a plurality of route circuits one for each of said routes and energized by the joint operation of the buttons for the signal locations at the ends of the corresponding route, each of said route circuits acting to condition the switch control means of the switch points in that route for operation to the normal or reverse position as required for that route, means responsive to the energization of a given route circuit for preventing the energization of the route circuits for all conflicting routes, indicating means on said track diagram for illuminating substantially linear portions of the track involved in the various routes, lighting circuits for said indicating means, and means responsive to the energization of a route circuit when said buttons are operated for a proposed route and operating independently of the operated position of the switch points for closing the lighting circuit of a selected indicating means to illuminate on said track diagram the portion of track included in that proposed route.

37. A switch and signal control system for railroad track layouts having power-operated switch points movable to provide various routes through said track layout between signal locations comprising, a control panel having thereon a miniature track diagram of the track layout and manually operable buttons adjacent the signal locations, route establishing means including a plurality of route circuits one belonging to each of the desired routes through said track layout and energized by the joint operation of the two buttons for the signal locations at the ends of the corresponding route, switch control relay means responsive to the energization of said route circuits and assuming normal or reverse control conditions upon energization of a given route circuit to position the switch points in the corresponding route to the normal or reverse position as required, means responsive to the energization of a given route circuit for preventing the energization of the route circuits for all conflicting routes, indicating means associated with said track diagram for illuminating substantially linear portions of the track involved in the various routes, means responsive to the energization of a given route circuit and operating independently of the operated position of the corresponding switch points for illuminating a portion of the track diagram included in the corresponding proposed route, and means responsive to the presence of a train in a route for controlling the illumination of a portion of the track diagram included in such route.

38. In an interlocking control system, a plurality of routes through a track layout, each including a track switch, route buttons for the two opposite ends of each route, a locking relay which when deenergized prevents operation of the track switch, a route relay for each route over the switch, a circuit for each route relay including contacts closed in response to the joint operation of the buttons for the opposite ends of the route, means controlled by each route relay when energized to operate the switch to the position required for the route, means controlled by each route relay and by the track switch effective when the switch assumes the position required for the route to release said locking relay, a signal for governing traffic movements over said route, and means controlled by the operated route buttons and rendered effective when said locking relay releases for clearing said signal.

39. In an interlocking control system, a plurality of routes through a track layout, each including a track switch, route buttons for the two opposite ends of each route, a locking relay which when deenergized prevents operation of the track switch, a route circuit for each route over the switch closed only in response to the joint operation of the buttons for the opposite ends of such route, a route relay for each route controlled by the corresponding route circuit, means controlled by each route relay when energized to operate the switch to the position required for the route, signals for each route for governing traffic movements over the route, signal control relays, circuits for said signal control relays including a circuit for each route over the switch each such circuit including a front contact of the route relay for such route and a contact which closes when the switch assumes a position in accordance with the route, means effective when any one of said signal control relays becomes energized to release said locking relay, and a circuit for each signal for clearing said signal including a front contact of a signal control relay and a back contact of said locking relay.

40. In a system for governing the operation of track switches and signals of a railway track layout, a control machine having a diagram representing the track switches and the portions of track between the signal locations of such track layout; manually operable buttons located on said diagram corresponding to the signal locations, a plurality of circuits each individually appertaining to a route over a given portion of track between the signals at the end thereof, each of said route circuits being closed and energized by the operation of the two buttons at the entrance and exit ends of the corresponding portion of track, relay means responsive to the energization of a given route circuit for governing the operation of all of the track switches in that route to a normal or reverse position as required for that route, locking means for each switch effective when deenergized to prevent operation thereof, a clearing circuit for each signal closed only if the locking means for the switches over which said signal governs traffic are deenergized, and means governed by a given route circuit and effective only if all of the switches for the corresponding route have been operated to the proper position for closing a break in the clearing circuit for a signal of that route.

41. In a system for controlling the operation of track switches and signals of a railway track layout by the operation of entrance and exit buttons associated with the entering and exit ends of the various routes over said track switches, a plurality of route circuits each individually appertaining to a particular route and closed only by joint manual actuation of the buttons at the entrance and exit ends of said route, means responsive to the energization of a given route circuit for closing a contact for the normal or the reverse position of each of the track switches in that route to govern the operation of said switches to positions required for that route, switch position detecting means including contacts closed in accordance with the existing position of each track switch, a signal control circuit for controlling the clearing of a signal for a given route including contacts operated by the route circuit for that route and contacts operated by the switch position detecting means of switches of that route, said circuit being closed only if such contacts for all of said switches are in corresponding positions, a lock relay for each switch, and means for clearing each signal governed by the corresponding signal control circuit and effective only if the lock relays for the switches in the route are deenergized.

42. In a system for governing the operation of track switches and signals of a railway track layout providing a plurality of routes from common entrance point to different exit points, switch control means for each switch in said routes and having normal and reverse contacts for governing the operation of that switch to the normal or reverse position, a lock relay for each switch which must be energized to permit operation thereof, contact means associated with each switch and operated in accordance with its position, a circuit for each of said routes including said contacting means of a switch and also the normal and reverse contacts of its switch control means with respect to all of the switches in that route, a signal at the common entrance to said routes, clearing circuits for said signal one for each route and including back contacts of the lock relays of the switches in that route, means responsive to the energization of said circuit for a given route for deenergizing only the lock relays of the switches involved in that route, manually operable means associated with the entrance and exit ends of said routes, and means responsive to the joint actuation of an entrance button and an exit button alone belonging to a given route for governing the switch control means of all of the switches for that route and for concurrently closing a break in said circuit corresponding to that route, whereby the lock relays are not deenergized for clearing the signal until all of the switches have operated their contacting means to positions corresponding with the normal and reverse contacts of their switch control means.

43. In a system of the character described for establishing routes over a railroad track layout by the actuation of the entrance-exit buttons associated with the ends of such routes, an individual switch control means for each switch having normal and reverse contacts controlling the operation of such switches to its normal or reverse position, contacting means associated with each switch and operated in accordance with the position of that switch, a circuit for each route including said contacting means of the switch and normal or reverse contacts of its switch control means with respect to all of the switches in the corresponding route, a lock relay for each switch which must be energized to permit operation thereof, route locking stick relays one for each switch and effective when deenergized to deenergize the corresponding lock relay for that switch, means for controlling the stick circuits of certain of said route locking stick relays by one or more other such stick relays dependent upon the position of a switch or switches, manually operable buttons associated with the entrance and exit ends of the various routes, a plurality of electro-responsive route control means one individually appertaining to each of the various routes and energized by the joint actuation of an entrance button and an exit button alone belonging to that route, means responsive to the actuation of the route control means for a given route for governing a switch control means for all of the switches in that route to operate their normal and reverse contacts and cause said switches to assume positions required for such route, a signal clearing circuit for each route including back contacts of the lock relays of the switches involved in that route, and means responsive to the energization of said circuit for each route for closing a break in the corresponding signal clearing circuit and for also at the same time deenergizing the route locking stick relay for one of the switches in that route, whereby the actuation of the entrance and exit buttons controls the switches for the route, and when these switches respond a circuit belonging to that route is closed to actuate a route locking stick relay and in turn such other stick relays as belong to other switches of the route, thereby deenergizing the appropriate lock relays to close their back contacts in the signal clearing circuit for that route.

44. In a system for controlling operation of power operated track switches and signals of a railway track layout, a control machine comprising a miniature diagram of said track layout and manually operable buttons on such diagram located at the entrance and exit ends of available routes through various portions of track over said track switches, electro-responsive route means individually appertaining to each of such routes and rendered effective by the manual operation of the two buttons alone at the entrance and exit ends of the corresponding route, and only if both buttons are operated, said electro-responsive means for a given route including contacts closed for the normal or reverse position of each of the track switches in that route, a signal control relay for each signal at the ends of said routes, an energizing circuit for each signal control relay closed only if all of the switches of the corresponding route have been operated to positions corresponding with the contacts of said electro-responsive means for that route, locking means for each switch governed by said signal control relays, and a signal clearing circuit for each signal closed by energization of the corresponding signal control relay only if said locking means of the switch for the route established for that signal are deenergized, whereby the clearing of each signal is dependent upon the proper positioning and locking of the switches in accordance with the electro-responsive means rendered effective by the manual operation of the buttons for the entrance and exit ends of such route.

45. In an interlocking control system for power operated track switches and signals of a railway track layout, a control machine comprising a diagram of the track layout and manually operable buttons on said diagram located at the points representing the ends of available routes through various portions of track over said track switches, electroresponsive route means for each such route operable only if the buttons at the entrance and exit ends of the corresponding route are actuated, a locking relay for each track switch which when deenergized prevents operation of that switch, means controlled by each electroresponsive means for operating the track switches as required to establish the corresponding route, means effective when all the track switches for a route have assumed positions in accordance with the route to release the locking relays for such track switches, and means rendered effective by the release of said locking relays for clearing the signal governing traffic over the corresponding route.

EARL M. ALLEN.
HOWARD A. THOMPSON.